US012316048B1

(12) United States Patent
Tan

(10) Patent No.: US 12,316,048 B1
(45) Date of Patent: May 27, 2025

(54) DATA CABLE

(71) Applicant: Dongguan Youhechuang Electronic Technology Co., Ltd., Dongguan (CN)

(72) Inventor: Hongping Tan, Dongguan (CN)

(73) Assignee: Dongguan Youhechuang Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 18/810,562

(22) Filed: Aug. 21, 2024

(30) Foreign Application Priority Data

| | | |
|---|---|---|
| Jun. 13, 2024 | (CN) | 202421356121.5 |
| Jun. 13, 2024 | (CN) | 202421356131.9 |
| Jun. 13, 2024 | (CN) | 202421356148.4 |
| Jun. 13, 2024 | (CN) | 202421356181.7 |

(51) Int. Cl.
*H01R 13/60* (2006.01)
*H01R 13/506* (2006.01)
*H01R 31/06* (2006.01)

(52) U.S. Cl.
CPC ........... *H01R 13/60* (2013.01); *H01R 13/506* (2013.01); *H01R 31/06* (2013.01)

(58) Field of Classification Search
CPC ....... H01R 13/60; H01R 13/506; H01R 31/06
See application file for complete search history.

(56) References Cited

U.S. PATENT DOCUMENTS

| | | | | |
|---|---|---|---|---|
| 7,850,476 B2 * | 12/2010 | Good | H01R 31/06 439/352 |
| 10,320,109 B2 * | 6/2019 | Drake | H01R 13/443 |
| 2007/0160327 A1 * | 7/2007 | Lewallen | G02B 6/3817 385/53 |

FOREIGN PATENT DOCUMENTS

| | | | |
|---|---|---|---|
| CN | 106992386 A | | 7/2017 |
| CN | 207116873 U | * | 3/2018 |
| CN | 207504298 U | | 6/2018 |
| CN | 211063007 U | | 7/2020 |
| CN | 212011538 U | | 11/2020 |
| JP | 3246114 U | * | 3/2024 |

* cited by examiner

*Primary Examiner* — Briggitte R. Hammond
(74) *Attorney, Agent, or Firm* — Andrew C. Cheng

(57) ABSTRACT

A data cable is provided, which includes a cable body and two plugs respectively connected to two ends of the cable body. Each plug is detachably connected to a sleeve joint having an accommodating groove. A first locking structure is provided on the plug, and a second locking structure, corresponding to the first locking structure, is provided on the sleeve joint. The second locking structure is movably connected or fixedly connected to the sleeve joint. When the plug enters the accommodating groove, the first locking structure is locked with the second locking structure. The locking is accomplished by providing a first locking structure on the plug and a second locking structure on the sleeve joint, thereby enhancing the connection strength and stability between the plug and the sleeve joint.

18 Claims, 18 Drawing Sheets

DATA CABLE

TECHNICAL FIELD

The present disclosure relates to the technical field of data cables, and in particular to a data cable.

BACKGROUND

The advancement of electronic technology has led to the proliferation of various electronic devices, including mobile phones, tablets, power banks, and other gadgets. These devices typically require data cables for charging and data transmission, prompting individuals to carry these cables when traveling.

However, the storage of data cables necessitates a certain amount of space, which can be cumbersome for travelers. In response to this need, data cables designed to function as lanyards have been developed for enhanced convenience. Nevertheless, the existing models of lanyard-compatible data cables exhibit inadequate connection strength at both ends, resulting in poor stability and a tendency to detach easily, thereby failing to maintain a lanyard configuration.

SUMMARY

In order to solve the problem mentioned in the existing art, a data cable is provided in the present disclosure.

To solve the technical problems above, a data cable is provided, which includes a cable body and two plugs respectively connected to two ends of the cable body. Each plug is detachably connected to a sleeve joint having an accommodating groove. A first locking structure is provided on the plug, and a second locking structure, corresponding to the first locking structure, is provided on the sleeve joint. The second locking structure is movably connected or fixedly connected to the sleeve joint. When the plug enters the accommodating groove, the first locking structure is locked with the second locking structure.

Preferably, the plug includes a connecting member connected to the cable body and a housing sleeved to the connecting member. The first locking structure is disposed at the connecting member and/or the housing.

Preferably, the first locking structure includes a first clamping protrusion and a first magnetic member. A first groove is provided on the connecting member. The housing is provided with a first opening corresponding to the first groove. The first magnetic member is disposed in the first groove and passes through the first opening to be exposed on the surface of the housing. The first clamping protrusion is disposed on the boundary of one side of the housing where the first opening is opened.

The second locking structure includes a locking tongue and a second magnetic member. A second groove is provided on the inner wall of the accommodating groove corresponding to the first groove, and the second magnetic member is located in the second groove. A through hole that is through the accommodating groove is provided on the sleeve joint, and the locking tongue extends from the inner wall of the accommodating groove to one side of the hole wall of the through hole close to the plug.

A locking groove is provided on one side of the first clamping protrusion close to the first magnetic member. When the second magnetic member and the first magnetic member are aligned and magnetically attracted, the first clamping protrusion inserts into the through hole, and the locking tongue enters the locking groove for locking.

Preferably, a notch is provided on the sleeve joint at a side thereof opposite to the side of the sleeve joint where the locking tongue is disposed. The notch is through the accommodating groove. The locking tongue and the second magnetic member are arranged on the same side of the sleeve joint.

Preferably, an inserting groove is formed between the housing and one side of the connecting member where the first groove is disposed. An inserting block is provided on the sleeve joint corresponding to the inserting groove, and the inserting block can be inserted into the inserting groove.

Preferably, the first locking structure includes a second clamping protrusion disposed on at least one side of the housing. The second locking structure includes a first locking member rotatably connected to the sleeve joint. A portion of the first locking member extends into the accommodating groove and engages with the second clamping protrusion. The first locking member rotates in a direction close to the accommodating groove or in a direction away from the accommodating groove to lock or unlock the second clamping protrusion.

Preferably, the first locking member includes a locking portion, a pressing portion and a connecting portion disposed between the locking portion and the pressing portion. The connecting portion is rotatably connected to the sleeve joint. A buckle groove is provided on one side of the locking portion close to the accommodating groove. The second clamping protrusion enters the buckle groove and engages with the buckle groove. The locking portion and the pressing portion rotate with respect to the connecting portion, driving the buckle groove to rotate with respect to the connecting portion to lock or unlock the second clamping protrusion.

Preferably, a first elastic member is provided on the sleeve joint. The first elastic member is connected to the locking portion or the pressing portion.

Preferably, the sleeve joint is provided with a second opening, with the first locking member engageably inserted into the second opening.

A shaft block is provided on the inner wall of the second opening, and a shaft groove matching the shaft block is provided on the connecting portion, and the connecting portion rotates on the shaft block through the shaft groove.

Preferably, the first locking structure includes a lock-cooperating structure, and the second locking structure includes a second locking member. The second locking member is inserted through the sleeve joint and movably connected to the sleeve joint. A portion of the second locking member extends into the accommodating groove and engages with the lock-cooperating structure. The second locking member moves in the direction perpendicular to the axis of the accommodating groove to lock or unlock the lock-cooperating structure.

Preferably, the second locking member includes a contact-pressing portion and a snap portion that are exposed from the sleeve joint. A portion of the snap portion extends into the accommodating groove and engages with the lock-cooperating structure. The contact-pressing portion moves along the direction perpendicular to the axis of the accommodating groove to drive the snap portion to move along the direction perpendicular to the axis of the accommodating groove to lock or unlock the lock-cooperating structure.

Preferably, a bracket and a second elastic member are provided in the accommodating groove. One end of the second elastic member is sleeved on the bracket, and the other end of the second elastic member is connected to the contact-pressing portion.

Preferably, a positioning groove is disposed on a side of the contact-pressing portion close to the accommodating groove. A portion of a bent section of the second elastic member is located in the positioning groove.

Preferably, a first limiting block is provided on one side of the snap portion close to the accommodating groove, and a limiting region is formed between the lock-cooperating structure and the area of the housing where the lock-cooperating structure is disposed. The first limiting block moves along the direction perpendicular to the axis of the accommodating groove to enter or leave the limiting region to correspondingly lock or unlock the lock-cooperating structure.

Preferably, a limiting protrusion is provided on a side of the snap portion facing away from the accommodating groove. The limiting protrusion abuts against the side wall of the sleeve joint.

Preferably, the first locking structure includes a floating plate and a third elastic member. A first accommodating groove is provided on at least one side of the connecting member. The third elastic member is arranged in the first accommodating groove. One end of the third elastic member away from the first accommodating groove is connected to the floating plate.

The second locking structure includes a clamping hole. An inserting hole is provided on the housing. A portion of the floating plate passes through the inserting hole and the clamping hole in sequence to be exposed on the surface of the sleeve joint and clamped with the clamping hole.

Preferably, the floating plate includes a floating portion and a fixing portion. The end of the floating portion away from the first accommodating groove passes through the inserting hole and is exposed on the surface of the housing. The end of the floating portion close to the first accommodating groove is connected to the third elastic member, and the fixing portion is clamped between the housing and the connecting member.

Preferably, a second limiting block is provided on the floating portion, and the second limiting block abuts against the inner wall of the housing. A fixing block is provided on the fixing portion, and a second accommodating groove is provided on the connecting member, and the fixing block is located in the second accommodating groove and abuts against the inner wall of the housing.

Preferably, the connecting member is connected with a data interface, with a waterproof member provided at the connection position where the connecting member is connected to the data interface, and the waterproof member covers the boundary of the housing corresponding to the connection position where the connecting member is connected to the data interface.

Preferably, a buckle portion is provided at one end of the sleeve joint away from the groove notch of the accommodating groove, and the buckle portion is separated from the accommodating groove.

Compared with the prior art, the data cable of the present disclosure has the following advantages.

In the present disclosure, the data cable includes a cable body and two plugs respectively connected to two ends of the cable body. Each plug is detachably connected to a sleeve joint having an accommodating groove. A first locking structure is provided on the plug, and a second locking structure is provided on the sleeve joint corresponding to the first locking structure. The second locking structure is movably connected or fixedly connected to the sleeve joint. When the plug enters the accommodating groove, the first locking structure is locked with the second locking structure. By arranging the first locking structure and the second locking structure on the plug and the sleeve joint respectively, locking is achieved through the mutual cooperation between the first locking structure and the second locking structure, thereby achieving a firm connection between the plug and the sleeve joint. Additionally, the connection strength and stability between the plug and the sleeve joint are enhanced, thereby addressing the issues commonly associated with existing data cables that serve as lanyards, which often exhibit inadequate connection strength, poor stability, and a tendency to detach, thus failing to maintain a lanyard configuration.

In the present disclosure, the first locking structure includes a first clamping protrusion and a first magnetic member. The second locking structure includes a locking tongue and a second magnetic member. When the second magnetic member is aligned with the first magnetic member and a magnetic connection is established, the first clamping protrusion inserts into the through hole, allowing the locking tongue to enter into the locking groove for locking. Consequently, the first clamping protrusion and the first magnetic member on the plug are configured to respectively cooperate with the locking tongue and the second magnetic member on the sleeve joint, which facilitates both magnetic fixation and engagement locking, thereby improving the stability and firmness of the connection between the plug and the sleeve joint by the two methods of magnetic fixation and engagement locking, making a more robust and stable connection between the plug and the sleeve joint.

In the present disclosure, the clamping groove is formed between one side of the connecting member where the first groove is arranged and the housing, and a clamping block is arranged on the sleeve joint corresponding to the clamping groove. The clamping block can be inserted into the clamping groove, which improves the stability of the connection between the plug and the sleeve joint, resulting in a more secure and robust connection. Furthermore, the clamping block works in conjunction with the locking tongue to provide additional resistance against any relative movement of the sleeve joint with respect to the surface of the plug.

In the present disclosure, the first locking structure includes a second clamping protrusion, and the second clamping protrusion is arranged on at least one side of the housing. The second locking structure includes a first locking member, the first locking member is rotatably connected to the sleeve joint, and a portion of the first locking member extends into the accommodating groove and engages with the second clamping protrusion. The first locking member rotates in a direction close or away from the accommodating groove to lock or unlock the second clamping protrusion. A portion of the first locking member can be moved and enter into the accommodating groove of the sleeve joint to be engaged with the second clamping protrusion, thus the second clamping protrusion is effectively locked to ensure that the plug inserted into the accommodating groove is firmly locked, thereby enhancing the connection strength and stability of the plug through the sleeve joint, which takes on a lanyard configuration. This configuration mitigates the risk of inadequate connection strength between the plug and the sleeve joint, as well as the potential for instability that may lead to the plugs at both ends detaching when the data cable assumes a lanyard configuration. Furthermore, when the lanyard configuration is no longer required, the portion of the first locking member that extends into the accommodating groove can be moved in a direction away from the groove, thereby unlocking the second clamping protrusion. This action facilitates the separation of the plug from the sleeve joint, thereby further enhancing the flexibility of the connection between the plug and the sleeve joint.

In the present disclosure, the sleeve joint is provided with an elastic member, which is connected to the locking portion or the pressing portion. By providing the elastic member, the locking portion or the pressing portion can be reset more timely after the locking portion or the pressing portion rotates.

In the present disclosure, the first locking structure includes a lock-cooperating structure, and the second locking structure includes a second locking member. The second locking member is inserted through the sleeve joint and movably connected to the sleeve joint. A portion of the second locking member extends into the accommodating groove and engages with the lock-cooperating structure. The second locking member moves along the direction perpendicular to the axis of the accommodating groove to lock or unlock the lock-cooperating structure. By providing the second locking member movably connected to the sleeve joint, the second locking member can be moved in a direction perpendicular to the axis of the accommodating groove, such that a portion of the second locking member can enter the accommodating groove and engage with the lock-cooperating structure on the plug entering the accommodating groove to lock the lock-cooperating structure, thereby locking the plug inserted into the accommodating groove, so as to improve the connection strength and stability of the plug in the configuration of a lanyard formed by the sleeve joint.

In the present disclosure, the first locking structure includes a floating plate and a third elastic member, and the second locking structure includes a clamping hole. An inserting hole is provided on the housing, and a portion of the floating plate passes through the inserting hole and the clamping hole in sequence to be exposed on the surface of the sleeve joint. The connection between the floating plate and the connecting member is established by positioning the third elastic member on the connecting member and linking the third elastic member to the floating plate. Additionally, a portion of the floating plate is securely clamped between the housing and the connecting member. This dual effect, involving both the connection of the third elastic member and the clamping action between the housing and the connecting member, ensures a robust attachment of the floating plate to the plug. Consequently, this configuration enhances the stability of the connection, thereby mitigating issues associated with a partially connected clamping block that is integrally formed on the outer housing. Such issues often lead to inadequate local connection strength, which can result in the loss of elasticity or even breakage after repeated plugging and unplugging, ultimately compromising the user experience.

In the present disclosure, the buckle portion is provided at one end of the sleeve joint away from the groove notch of the accommodating groove, and the buckle portion is separated from the accommodating groove. Therefore, after the sleeve joint is connected to the plug, the plug located in the accommodating groove is also separated from the buckle portion, thereby avoiding the influence of other structures on the plug when the buckle portion is connected to other structures.

BRIEF DESCRIPTION OF DRAWINGS

In order to more clearly illustrate the technical solutions of the embodiments of the present disclosure, the drawings needed to be used in the description of the embodiments will be briefly introduced below. Obviously, the drawings in the following description are some embodiments of the present disclosure. Those of ordinary skill in the art can also obtain other drawings based on these drawings without exerting creative work.

Figure 1:
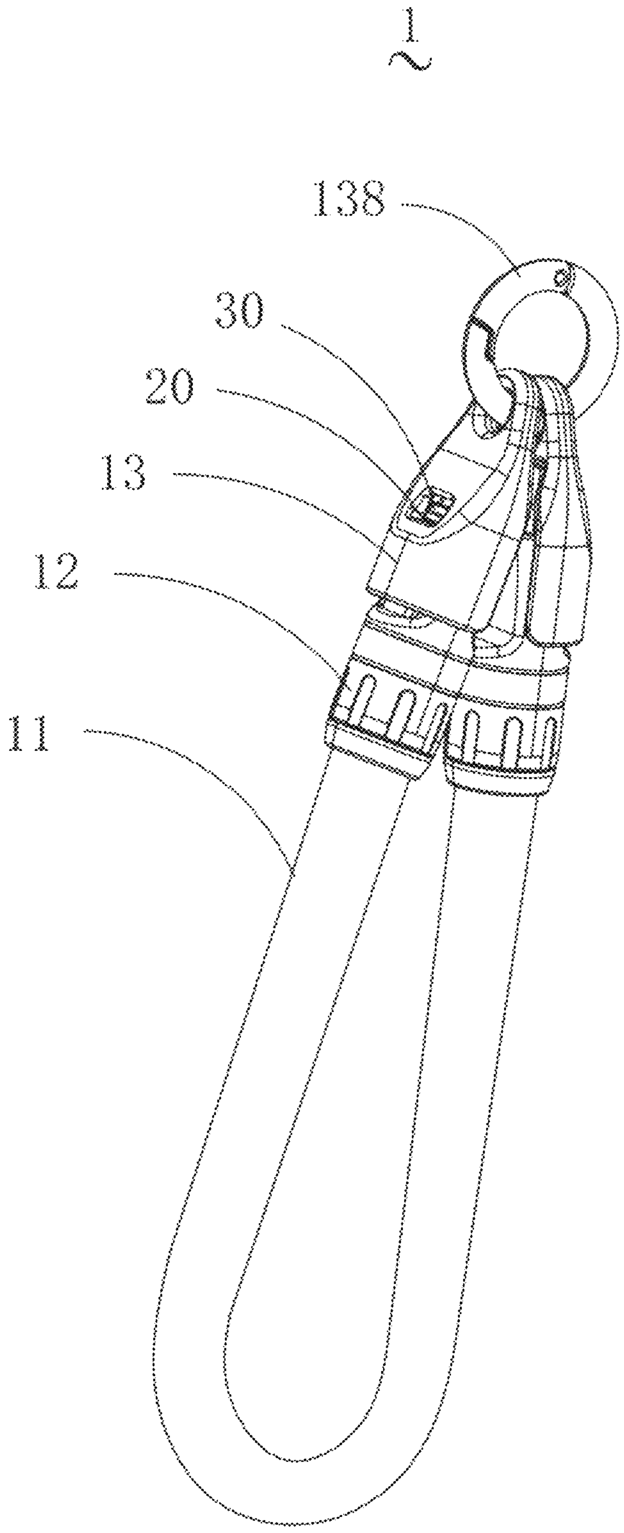
FIG. 1 is a perspective view of a data cable in a lanyard state according to a first embodiment of the present disclosure.

In the drawings, the parts represented by each number are listed as follows:

1, data cable;

11, cable body; 12, plug; 13, sleeve joint; 20, first locking structure; 30, second locking structure; 21, first locking member; 22, first elastic member; 31, second locking member; 32, second elastic member; 41, third elastic member; 42, floating plate; 51, waterproof member;

121, connecting member; 122, housing; 123, data interface; 124, first magnetic member; 125, first clamping protrusion; 126, limiting region; 127, second clamping protrusion; 128, lock-cooperating structure; 131, accommodating groove; 132, locking tongue; 133, through hole; 134, second magnetic member; 135, notch; 136, inserting block; 137, buckle portion; 138, buckle member; 139, second groove; 141, second opening; 142, second limiting groove; 151, bracket; 152, first window; 153, second window; 161, clamping hole; 162, sliding region; 211, locking portion; 212, pressing portion; 213, connecting portion; 311, contact-pressing portion; 312, snap portion; 321, bent section; 411, spiral center; 421, floating portion; 422, fixing portion; 1211, first groove; 1212, inserting groove; 1214, first accommodating groove; 1215, second accommodating groove; 1221, first opening; 1223, inserting hole; 1251, locking groove; 1281, third clamping protrusion; 1282, clamping groove; 1371, buckle hole; 1411, shaft block; 2111, first limiting groove; 2112, buckle groove; 2113, shaft groove; 3111, positioning groove; 3121, first limiting block; 3122, limiting protrusion; 4211, second limiting block; 4221, fixing block.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative efforts fall within the scope of protection of the present disclosure.

It should be noted that when an element is referred to as being "fixed" to another element, it can be directly on the other element or intervening elements may also be present. When an element is referred to be "connected" to another element, it can be directly connected to the other element or there may also be intervening elements present. The terms "vertical," "horizontal," "left," "right," and similar expressions are used herein for illustrative purposes only.

Figure 3:
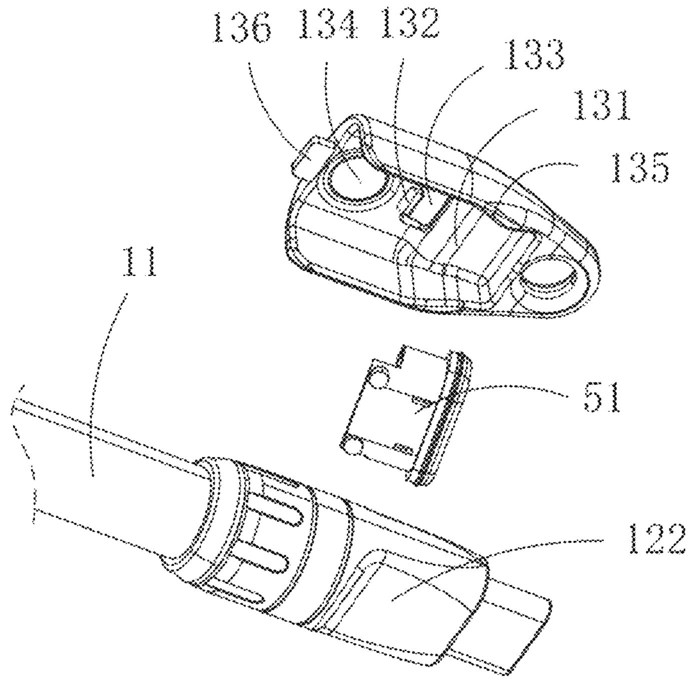
FIG. 3 is another exploded view of the partial structure of the data cable according to the first embodiment of the present disclosure.

Please refer to FIGS. 1 and 3. A first embodiment of the present disclosure provides a data cable 1, which includes a cable body 11 and two plugs 12 respectively connected to two ends of the cable body 11. Each plug 12 is detachably connected to a sleeve joint 13 having an accommodating groove 131. A first locking structure 20 is provided on the plug 12, and a second locking structure 30, corresponding to the first locking structure 20, is provided on the sleeve joint 13. The second locking structure 30 is movably connected or fixedly connected to the sleeve joint 13. When the plug 12 enters the accommodating groove 131, the first locking structure 20 is locked with the second locking structure 30.

Specifically, the cable body 11 is designed for charging electronic devices or facilitating data transmission. The first locking structure 20 and the second locking structure 30 can be secured through various connection manners, such as engagement or magnetic attraction. It is important to note that the connection manners thereof are not limited in this embodiment, namely any connection manners that effectively achieves a secure locking between the first locking structure 20 and the second locking structure 30 is acceptable. Consequently, the first locking structure 20 and the second locking structure 30 are interlocked through the corresponding structures thereof, resulting in a robust connection between the plug 12 and the sleeve joint 13. Additionally, the connection strength and stability between the plug 12 and the sleeve joint 13 is enhanced, thereby addressing the issues commonly associated with existing data cables that serve as lanyards, which often exhibit inadequate connection strength, poor stability, and a tendency to detach, thus failing to maintain a lanyard configuration.

Figure 2:
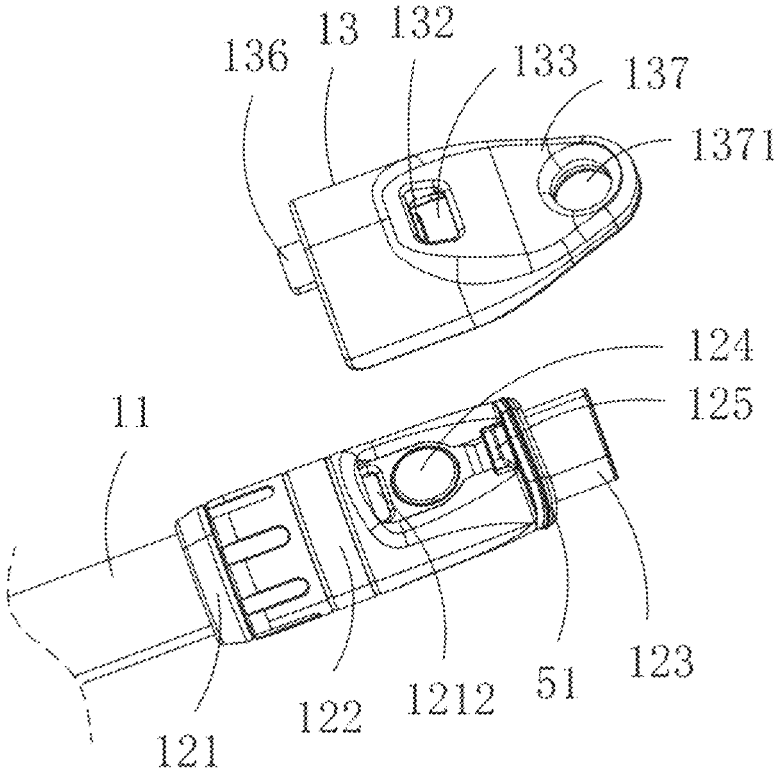
FIG. 2 is an exploded view of a partial structure of the data cable according to the first embodiment of the present disclosure.
Figure 4:
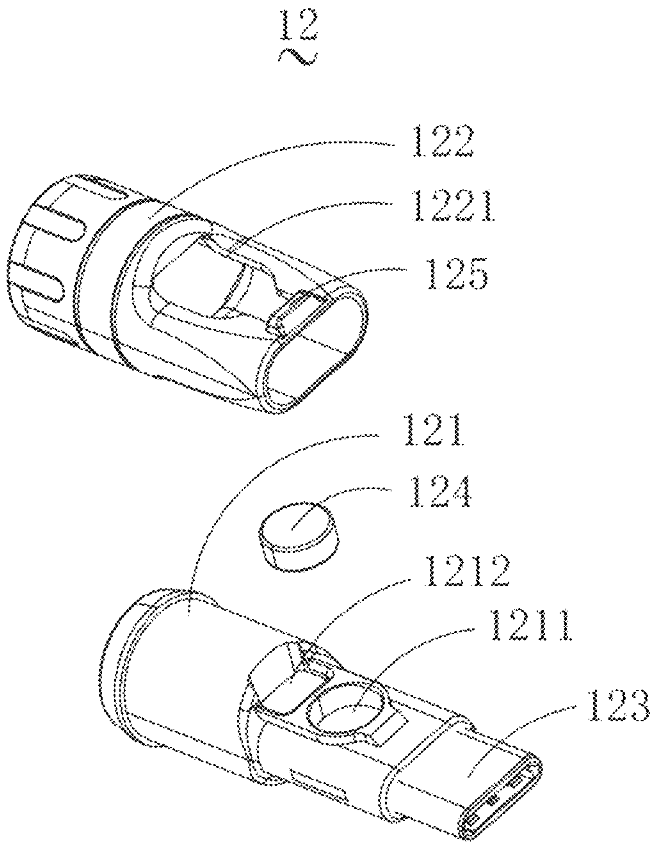
FIG. 4 is an exploded view of the plug of the data cable according to the first embodiment of the present disclosure.

Please refer to FIG. 2 and FIG. 4. Further, the plug 12 includes a connecting member 121 connected to the cable body 11 and a housing 122 sleeved to the connecting member 121. The first locking structure 20 is disposed at the connecting member 121 and/or the housing 122.

Understandably, the plug 12 includes the connecting member 121, the housing 122, and a data interface 123 that is connected to the cable body 11. The connecting member 121 encases the portion where the data interface 123 is connected to the cable body 11, thereby safeguarding the portion where the data interface 123 is connected to the cable body 11. The housing 122 is sleeved on the surface of the connecting member 121 and encases a substantial portion of the connecting member 121, preferably encasing at least four-fifths of the connecting member 121, thus protecting the connecting member 121 via the housing 122. In this embodiment, there are no limitations regarding the types of the data interfaces 123 in two plugs 12 respectively connected to two ends of the same cable body 11, namely the types thereof may be identical or different. The types of the data interfaces 123 may include, but are not limited to, USB interface, Micro USB interface, Type-C interface, and Lightning interface.

Please refer to FIG. 2 and FIG. 3. Further, a waterproof member 51 is provided at a connection position where the connecting member 121 is connected to the data interface 123. The waterproof member 51 covers the boundary of the housing 122 corresponding to the connection position where the connecting member 121 is connected to the data interface 123.

Understandably, as an optional implementation, the waterproof member 51 may be provided at the connection position where the connecting member 121 is connected to the data interface 123. The waterproof member 51 can be inserted between the housing 122 and the connecting member 121 starting from the connection position where the connecting member 121 is connected to the data interface 123 by means of insertion, and covers the housing 122 corresponding to the connection position, thereby sealing the connection position to prevent the ingress of liquid into the interior of the plug 12, which could potentially compromise the electrical integrity within the plug 12. In this embodiment, preferably, the waterproof member 51 may be a waterproof soft rubber ring, as this would allow the elastic nature of the ring to fill the gap between the connecting member 121 and the housing 122 corresponding to the connection position where the connecting member 121 is connected to the data interface 123, thus ensuring effective sealing at this position.

In an alternative implementation, the waterproof member 51 may be omitted, and the housing 122 may be configured to extend towards one end of the data interface 123 to directly cover the connection position where the connecting member 121 is connected to the data interface 123, thereby allowing the housing 122 to directly enclose and cover the connection position thereof. Consequently, the connection position is effectively sealed by the housing 122, thereby ensuring protection against the ingress of liquids or dust.

Figure 5:
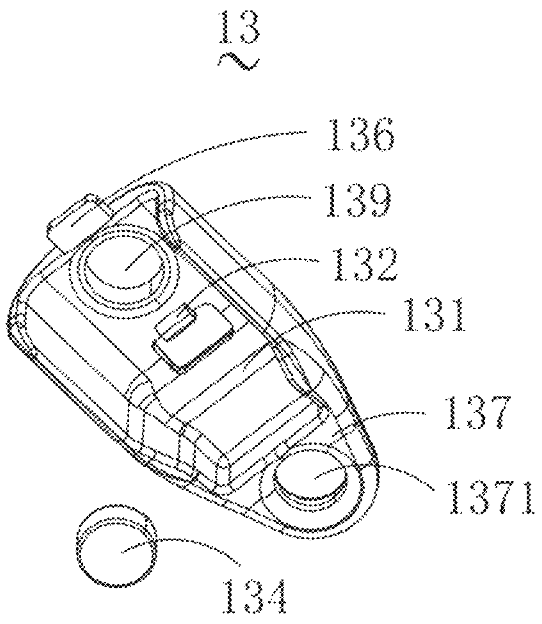
FIG. 5 is an exploded view of the sleeve joint of the data cable according to the first embodiment of the present disclosure.
Figure 6:
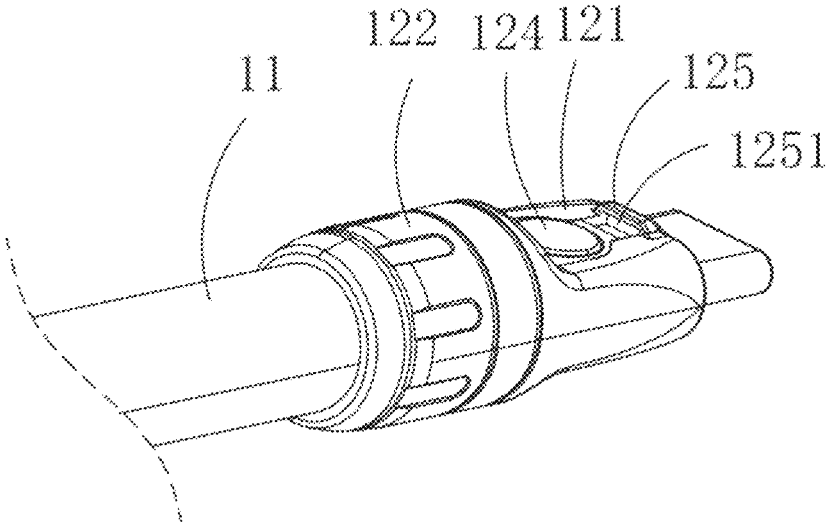
FIG. 6 is a schematic diagram of a partial structure of the data cable according to the first embodiment of the present disclosure.

Please refer to FIG. 2 and FIG. 5. Furthermore, a buckle portion 137 is disposed at one end of the sleeve joint 13 away from the groove notch of the accommodating groove 131, and the buckle portion 137 is separated from the accommodating groove 131.

Understandably, the sleeve joint 13 is specifically connected to other structures of the data cable 1, apart from the plug 12 thereof, via the buckle portion 137. The buckle portion 137 is separated from the accommodating groove 131. After the sleeve joint 13 is connected to the plug 12, the plug 12, which located within the accommodating groove 131, is also separated from the buckle portion 137. This ensures that when the buckle portion 137 is connected to other structures thereof, any potential interference from those structures on the plug 12 is effectively mitigated.

In an alternative implementation, the buckle portion 137 may form a buckle hole 1371, and a buckle member 138 inserts through the buckle hole 1371. After the sleeve joint 13 is connected to the plug 12, the sleeve joint 13 located at both ends of the same cable body 11 can be interconnected via the buckle member 138, thereby enabling the data cable 1 to form the configuration of a lanyard. The buckle hole 1371 and the buckle member 138 enhance the stability of the formed lanyard configuration.

In another alternative implementation, the buckle portion 137 is configured to function as a hook, allowing for the direct connection of the buckle portion 137 on the sleeve joint 13, which is linked by two plugs 12 at either end of the same cable body 11, to a same hook position. This configuration enables the data cable 1 to be uniformly arranged as a lanyard. By functioning the buckle portion 137 as a direct hook, the manner of hanging becomes more versatile and applicable across a wider range of scenarios.

Please refer to FIGS. 2-6. Further, the first locking structure 20 includes a first clamping protrusion 125 and a first magnetic member 124. A first groove 1211 is provided on the connecting member 121. The housing 122 is provided with a first opening 1221 corresponding to the first groove 1211. The first magnetic member 124 is disposed in the first groove 1211 and passes through the first opening 1221 to be exposed on the surface of the housing 122. The first clamping protrusion 125 is disposed on the boundary of one side of the housing 122 where the first opening 1221 is opened.

The second locking structure 30 includes a locking tongue 132 and a second magnetic member 134. A second groove 139 is provided on the inner wall of the accommodating groove 131 corresponding to the first groove 1211, and the second magnetic member 134 is located in the second groove 139. A through hole 133 that is through the accommodating groove 131 is provided on the sleeve joint 13, and the locking tongue 132 extends from the inner wall of the accommodating groove 131 to one side of the hole wall of the through hole 133 close to the plug 12.

A locking groove 1251 is provided on one side of the first clamping protrusion 125 close to the first magnetic member 124. When the second magnetic member 134 and the first magnetic member 124 are aligned and magnetically attracted, the first clamping protrusion 125 inserts into the through hole 133, and the locking tongue 132 enters the locking groove 1251 for locking.

Understandably, in this embodiment, the first locking structure 20, provided on the plug 12, includes a first clamping protrusion 125 and a first magnetic member 124, both of which may be arranged on one same side of the plug 12. The second locking member structure 30, provided on the sleeve joint 13, includes a locking tongue 132 and a second magnetic member 134. The first clamping protrusion 125 and the first magnetic member 124 are disposed to correspond with the locking tongue 132 and the second magnetic member 134, respectively. When the plug 12 enters into the accommodating groove 131, the end of the first magnetic member 124 away from the first groove 1211 can pass through the first opening 1221 and become exposed on the surface of the housing 122, so as to be aligned with the second magnetic member 134 to achieve magnetic fixation. Subsequently, after the first clamping protrusion 125 inserts into the through hole 133, the locking tongue 132 can enter into the locking groove 1251, such that the side of the locking tongue 132 away from the first magnetic member 124 abuts against the side of the locking groove 1251 close to the second magnetic member 134, while the side of the locking tongue 132 away from the accommodating groove 131 abuts against the side of the locking groove 1251 close to the connecting member 121. This configuration effectively restricts vertical movement of the first clamping protrusion 125 within the through hole 133, thereby preventing the first clamping protrusion 125 from dislodging and securing it in place. That is, the first clamping protrusion 125 is locked in the through hole 133. Consequently, both magnetic fixation and mechanical locking are achieved, enhancing the stability and integrity of the connection between the plug 12 and the sleeve joint 13, and resulting in a more robust and stable connection, particularly when the plug 12 is configured in a lanyard shape via the sleeve joint 13. Such improvements mitigate issues related to insufficient connection strength and instability at the plug 12 and the sleeve joint 13 of the data cable 1, thereby reducing the likelihood of disconnection when the data cable 1 forms a lanyard configuration.

It should be noted that both the first magnetic member 124 and the second magnetic member 134 may possess identical shapes and dimensions, and the shapes and dimensions of the first groove 1211 and the second groove 139 corresponding to those of the first magnetic member 124 and the second magnetic member 134 respectively, such that when the lock tongue 132 enters into the locking groove 1251, the second magnetic member 134 and the first magnetic member 124 achieve a positively aligned magnetic attraction position, resulting in the maximum magnetic attraction force. That is, the boundary of the second magnetic member 134 abuts against that of the first magnetic member 124, thereby ensuring the stability of the locking tongue 132 within the locking groove 1251. Furthermore, it is possible that during the user's attempt to connect the plug 12 and the sleeve joint 13, if excessive force is applied, the plug 12 will be inserted too deeply into the accommodating groove 131, in which case the locking tongue 132 may not properly enter into the locking groove 1251. In such instances, the second magnetic member 134 is misaligned with the first magnetic member 124. However, upon the release of force by the user, the magnetic attraction will facilitate the automatic realignment of the second magnetic member 134 with the first magnetic member 124, simultaneously guiding the locking tongue 132 into the locking groove 1251 to lock.

Optionally, a portion of the locking tongue 132 on the inner wall of the accommodating groove 131 may be configured to be inclined towards a direction away from the through hole 133. Additionally, the first clamping protrusion 125 may be inclined towards the connecting member 121 on the side thereof away from the first magnetic member 124, ensuring that the inclined direction of the portion of the locking tongue 132 within the accommodating groove 131 corresponds with that of the first clamping protrusion 125, which facilitates the entry of the first clamping protrusion 125 into the through hole 133, thereby achieving a secure locking with the locking tongue 132 while minimizing friction between the first clamping protrusion 125 and the locking tongue 132 prior to locking.

In an alternative implementation, the height of the first magnetic member 124 within the first groove 1211 is configured to be less than the distance from the bottom of the first groove 1211 to the housing 122, which ensures that the first magnetic member 124 is located beneath the housing 122 and does not extend beyond the surface of the housing 122. Correspondingly, the second magnetic member 134 is configured to protrude with respect to the second groove 139 to facilitate its entry between the housing 122 and the connecting member 121 through the first opening 1221, thereby enabling effective attraction to the first magnetic member 124. This configuration not only enhances the overall aesthetic appeal of the plug 12 but also prevents misalignment between the first magnetic member 124 and the second magnetic member 134 during the attraction process, as the first opening 1221 abuts against the second magnetic member 134.

Please refer to FIG. 3. Further, a notch 135 is provided on the sleeve joint 13 at a side thereof opposite to the side of the sleeve joint 13 where the locking tongue 132 is disposed. The notch 135 is through the accommodating groove 131. The locking tongue 132 and the second magnetic member 134 are arranged on the same side of the sleeve joint 13.

Understandably, the notch 135 can be arranged at one side opposite to the side where the locking tongue 132 and the first magnetic member 124 are located, such that the sleeve joint 13 form a semi-enclosed configuration to make the groove notch of the accommodating groove 131 through the notch 135. That is, the accommodating groove 131 forms a shape where two adjacent sides thereof—one side corresponding to the groove notch and another side corresponding to the locking tongue 132—are in a mutually-through configuration. Consequently, the entry of the plug 12 into the accommodating groove 131 from the notch 135 and the groove notch of the accommodating groove 131 can be facilitated with greater ease. Furthermore, this configuration contributes to cost savings and weight reduction of the sleeve joint 13. As a result, in this configuration, both the locking tongue 132 and the second magnetic member 134 can be arranged on the same side, and the connection strength between the plug 12 and the sleeve joint 13 is established through two methods of securing the same side: magnetic fixation and engagement.

Figure 7:
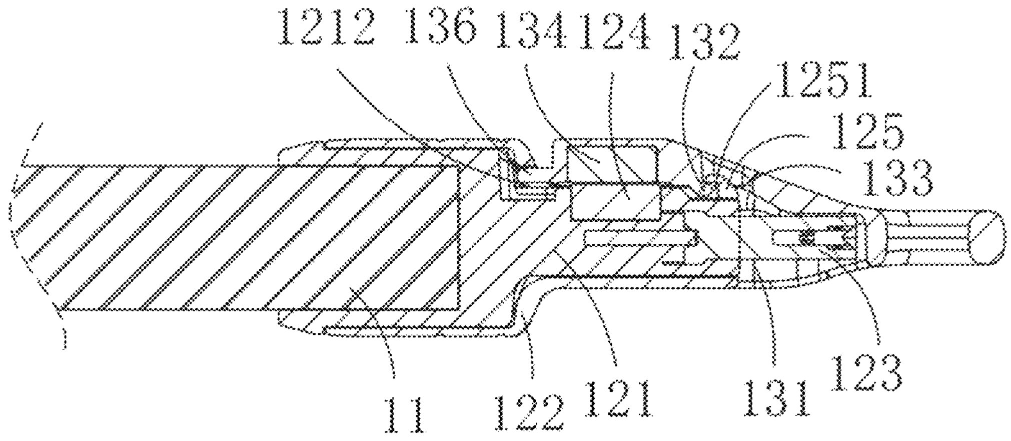
FIG. 7 is a cross-section view of the data cable according to the first embodiment of the present disclosure.

Please refer to FIGS. 2 and 7. Further, an inserting groove 1212 is formed between the housing 122 and one side of the connecting member 121 where the first groove 1211 is disposed. An inserting block 136 is provided on the sleeve joint 13 corresponding to the inserting groove 1212, and the inserting block 136 can be inserted into the inserting groove 1212.

Understandably, the inserting groove 1212 is formed between the housing 122 and one side of the connecting member 121 where the first groove 1211 is disposed. Additionally, the inserting block 136 is disposed at the boundary of the sleeve joint 13, and the position of the inserting block 136 corresponds to that of the inserting groove 1212. When the sleeve joint 13 is connected to the plug 12, the plug 12 enters into the accommodating groove 131. When the first clamping protrusion 125 and the locking tongue 132 are locked, and the first magnetic member 124 and the second magnetic member 134 achieve magnetic fixation, the inserting block 136 is inserted into the inserting groove 1212, which significantly enhances the stability of the connection between the plug 12 and the sleeve joint 13, ensuring a more secure and robust linkage. Furthermore, the locking cooperation of the inserting block 136 in conjunction with the locking tongue 132 effectively prevents any relative sliding of the sleeve joint 13 against the surface of the plug 12.

It should be noted that the insertion depth of the inserting block 136 into the inserting groove 1212 is greater than that of the locking tongue 132 into the locking groove 1251. Consequently, when the locking tongue 132 is inserted and secured within the locking groove 1251, the inserting block 136 will remain securely positioned within the inserting groove 1212 and will not dislodge.

A second embodiment of the present disclosure is provided, distinguished from the first embodiment by the variation in the configurations of the first locking structure 20 and the second locking structure 30, while the other structural components may remain unchanged.

Figure 8:
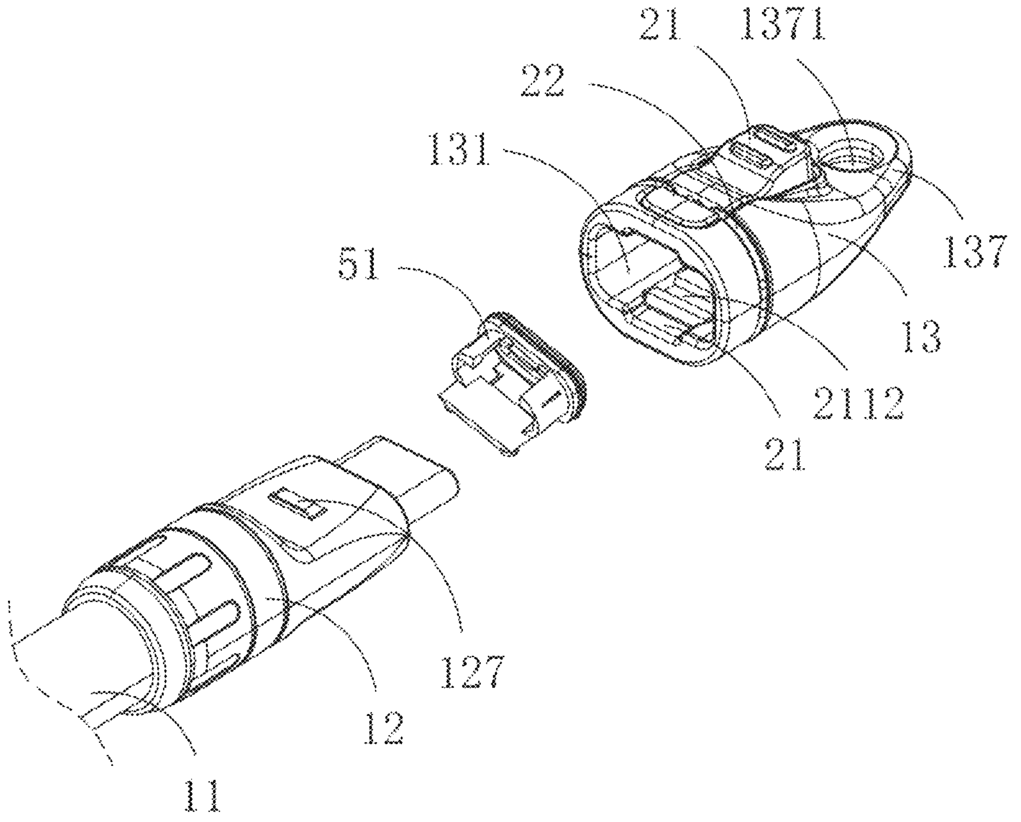
FIG. 8 is an exploded view of a partial structure of the data cable according to a second embodiment of the present disclosure.

Please refer to FIG. 8, specifically, the first locking structure 20 includes a second clamping protrusion 127 disposed on at least one side of the housing 122. The second locking structure 30 includes a first locking member 21 rotatably connected to the sleeve joint 13. A portion of the first locking member 21 extends into the accommodating groove 131 and engages with the second clamping protrusion 127. The first locking member 21 rotates in a direction close to the accommodating groove 131 or in a direction away from the accommodating groove 131 to lock or unlock the second clamping protrusion 127.

Understandably, the first locking member 21 is rotatably connected to the sleeve joint 13. The rotation direction of the first locking member 21 is from the surface of the sleeve joint 13 to the accommodating groove 131 and from the accommodating groove 131 to the surface of the sleeve joint 13, that is, from the side of the sleeve joint 13 without the accommodating groove 131 to the side with the accommodating groove 131, and from the side of the sleeve joint 13 with the accommodating groove 131 to the side without the accommodating groove 131, that is, the direction of passing through the sleeve joint 13 into the accommodating groove 131 and the direction of passing through the sleeve joint 13 from the accommodating groove 131 to the exterior. Consequently, a portion of the first locking member 21 can be configured to extend into the accommodating groove 131, allowing it to rotate into the accommodating groove 131 and make the portion of the first locking member 21 that enters the accommodating groove 131 to protrude with respect to the inner wall of the accommodating groove 131, such that this portion of the first locking member 21 is engaged with the second clamping protrusion 127 to lock the second clamping protrusion 127. When the lanyard configuration is no longer required, the portion of the first locking member 21 that extends into the accommodating groove 131 can move in a direction away from the accommodating groove 131, thereby unlocking the second clamping protrusion 127 and allowing for the separation of the plug 12 from the sleeve joint 13, which significantly enhances the flexibility of the connection between the sleeve joint 13 and the plug 12.

Figure 9:
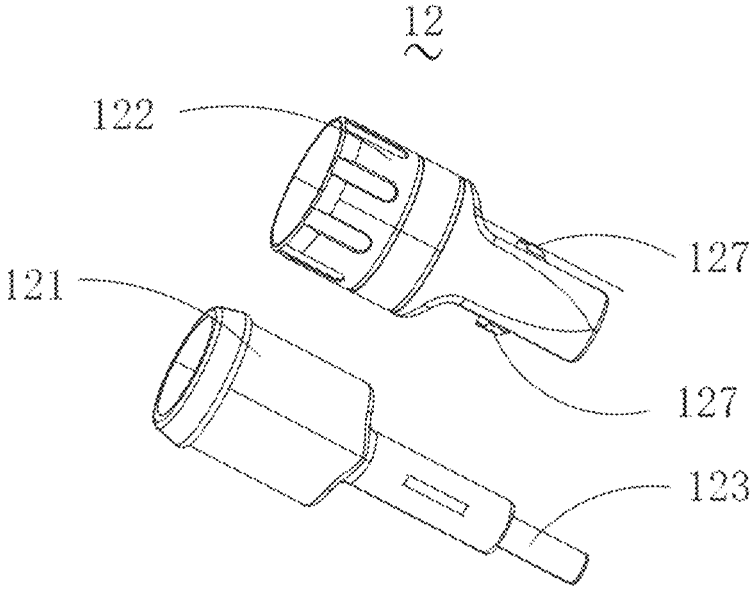
FIG. 9 is an exploded view of the plug of the data cable according to the second embodiment of the present disclosure.

Please refer to FIG. 9. Optionally, in this embodiment, two second clamping protrusions 127 are arranged on two sides of the housing 122 respectively. The quantity and placement of the first locking members 21 must correspond to those of the second clamping protrusions 127 to ensure a one-to-one locking effect therebetween. The two sides of the housing 122 where the second clamping protrusions 127 are disposed face opposite to and away from each other. Accordingly, the locations of the two second clamping protrusions 127 also face opposite to and away from each other, resulting in a symmetrical arrangement of the second clamping protrusions 127. Consequently, the plug 12 as a whole exhibits a symmetrical arrangement. Specifically, the second clamping protrusions 127 are respectively arranged on two opposing sides of the housing 122, resulting in a symmetrical distribution of the second clamping protrusions 127 with respect to the entire plug 12. This configuration ensures that, upon locking with the first locking member 21, the locking force is applied more uniformly, and the locking effect achieved when the plug 12 is connected to the sleeve joint 13 is more balanced, thereby enhancing the stability of the connection between the plug 12 and the sleeve joint 13 and mitigating the risk of unilateral locking and unstable clamping. Additionally, this configuration further optimizes the locking effect when the sleeve joint 13 and the plug 12 are interconnected and locked.

Figure 10:
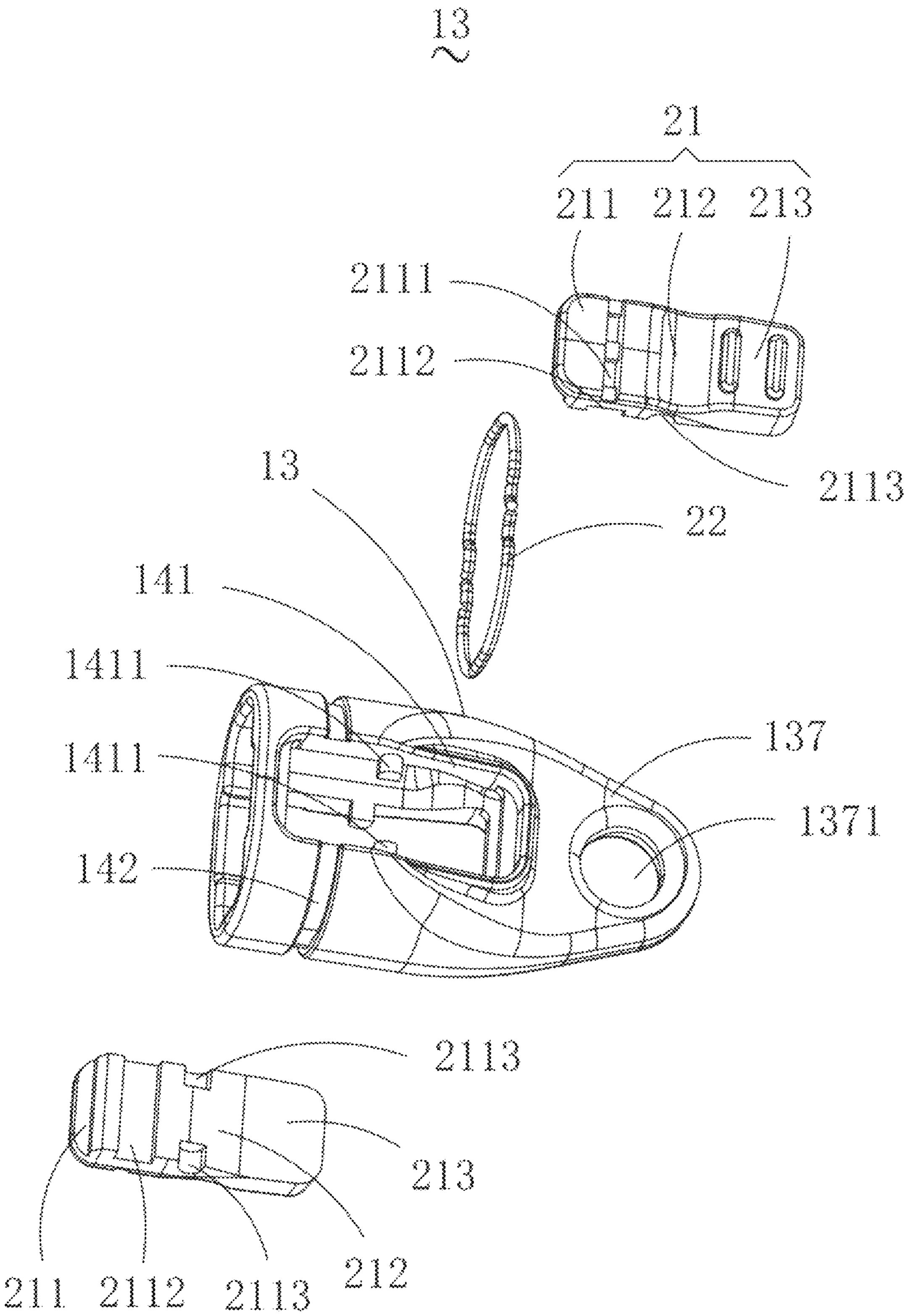
FIG. 10 is an exploded view of the sleeve joint of the data cable according to the second embodiment of the present disclosure.

Please refer to FIG. 10. Further, the first locking member 21 includes a locking portion 211, a pressing portion 212 and a connecting portion 213 disposed between the locking portion 211 and the pressing portion 212. The connecting portion 213 is rotatably connected to the sleeve joint 13. A buckle groove 2112 is provided on one side of the locking portion 211 close to the accommodating groove 131. The second clamping protrusion 127 enters the buckle groove 2112 and engages with the buckle groove 2112. The locking portion 211 and the pressing portion 212 rotate with respect to the connecting portion 213, driving the buckle groove 2112 to rotate with respect to the connecting portion 213 to lock or unlock the second clamping protrusion 127.

Understandably, the locking portion 211, the pressing portion 212, and the connecting portion 213 can be integrally constructed to form a complete first locking member 21, thereby ensuring a secure connection among the various components. The locking portion 211 and the pressing portion 212 are capable of rotating with respect to the connecting portion 213, that is, the connecting portion 213 acts as the central axis, around which the locking portion 211 and the pressing portion 212 rotate in a seesaw-like motion. The user may apply pressure to the pressing portion 212, causing it to rotate with respect to the connecting portion 213 towards a direction close to the accommodating groove 131. Concurrently, this action drives the locking portion 211 to rotate with respect to the connecting portion 213 towards a direction away from the accommodating groove 131, allowing the locking portion 211 entering the accommodating groove 131 to exit the accommodating groove 131 and enabling the plug 12 to be inserted into the accommodating groove 131. Upon completion of the pressing action, both the pressing portion 212 and the locking portion 211 return to their original positions, such that the locking portion 211 enters into the accommodating groove 131 to make the second clamping protrusion 127 to be engageably inserted into the buckle groove 2112, facilitating the locking of the second clamping protrusion 127. In instances where it is necessary to detach the plug 12 from the sleeve joint 13, force may be applied to the pressing portion 212, resulting in the rotation of both the pressing portion 212 and the locking portion 211. This action causes the locking portion 211 to leave the accommodating groove 131 to cause the buckle groove 2112 to leave the accommodating groove 131, thereby unlocking the second clamping protrusion 127 to separate the plug 12 from the sleeve joint 13. The first locking member 21 effectively controls the rotation of the locking portion 211 through the application of pressure.

Please refer to FIG. 10, further, the sleeve joint 13 is provided with a second opening 141, with the first locking member 21 engageably inserted into the second opening 141. A shaft block 1411 is provided on the inner wall of the second opening 141, and a shaft groove 2113 matching the shaft block 1411 is provided on the connecting portion 213, and the connecting portion 213 rotates on the shaft block 1411 through the shaft groove 2113.

Understandably, the dimension and shape of the second opening 141 are configured to correspond with those of the first locking member 21, such that the first locking member 21 can be entirely engageably inserted into the second opening 141 and the locking portion 211 of the first locking member 21 can enter into the accommodating groove 131. Additionally, a shaft block 1411 may be disposed at the inner wall of the second opening 141. The shaft block 1411 may be specifically disposed on two opposite sides of the inner wall of the second opening 141, that is, one shaft block 1411 is correspondingly disposed on each side thereof, such that the two shaft blocks 1411 are disposed opposite to each other. The end of each shaft block 1411, which is away from the accommodating groove 131, may be shaped in an arc, enabling the shaft groove 2113 provided on the connecting portion 213 to rotate around the shaft block 1411. This configuration allows for the rotation of both the locking portion 211 and the pressing portion 212. That is, the shaft block 1411 functions as a rotation fulcrum, supporting the rotational movement of the locking portion 211 and the pressing portion 212 of the first locking member 21. Therefore, the locking portion 211 and the pressing portion 212 of the first locking member 21 can move close to or away from the accommodating groove 131 with the shaft block 1411 as the rotation fulcrum to achieve pressing, which enhances user feedback, thereby improving the controllability and comfort associated with the pressing action.

Please refer to FIG. 8 and FIG. 10. Further, a first elastic member 22 is provided on the sleeve joint 13. The first elastic member 22 is connected to the locking portion 211 or the pressing portion 212.

Understandably, the first elastic member 22 is provided on the sleeve joint 13. The first elastic member 22 is connected to the locking portion 211 or the pressing portion 212, which facilitates a more efficient reset of the locking portion 211 or the pressing portion 212 following the rotation thereof.

In an alternative implementation, the first elastic member 22 is connected to the pressing portion 212, and the first elastic member 22 may be arranged on the side of the pressing portion 212 that faces the accommodating groove 131. Upon application of pressure to the pressing portion 212, the first elastic member 22 undergoes contraction and deformation. Following the release of pressure, the first elastic member 22 returns to its original state, exerting an elastic force on the pressing portion 212. This action facilitates a rapid and timely reset of the pressing portion 212, thereby enhancing the efficiency of the locking portion's reset.

In another alternative implementation, the first elastic member 22 is connected to the locking portion 211. In this case, a first limiting groove 2111 may be positioned on the side of the locking portion 211 away from the accommodating groove 131. Additionally, a second limiting groove 142 can be provided on the surface of the sleeve joint 13. The combination of the first limiting groove 2111 and the second limiting groove 142 creates an annular groove. When the first elastic member 22 is sleeved to the annular groove formed by the combination of the first limiting groove 2111 and the second limiting groove 142, a portion of the first elastic member 22 passes through the first limiting groove 2111, thereby facilitating the sleeve connection between the locking portion 211 and the sleeve joint 13. After the application of pressure, and the first locking member 21 rotates in a direction away from the accommodating groove

131, the elastic force exerted by the first elastic member 22 enables the locking portion 211 to reset rapidly, which in turn drives a more rapid resetting of the pressing portion 212. After the locking portion 211 is locked with the second clamping protrusion 127, the elastic force resulting from the deformation of the first elastic member 22 securely maintains the locking portion 211 in its current position, thereby preventing any movement and enhancing the locking efficacy of the first locking member 21. Furthermore, the first elastic member 22 sleeves the locking portion 211 and the sleeve joint 13, which amplifies the force exerted by the user on the pressing portion 212. It is only when this force exceeds a predetermined threshold that the pressing portion 212 can rotate and subsequently drive the locking portion 211 to rotate, thus mitigating the risk of accidental activation of the pressing portion 212 by the user.

A third embodiment of the present disclosure is provided, distinguished from the first and second embodiments by the variation in the configurations of the first locking structure 20 and the second locking structure 30, while the other structural components may remain unchanged.

Figure 11:
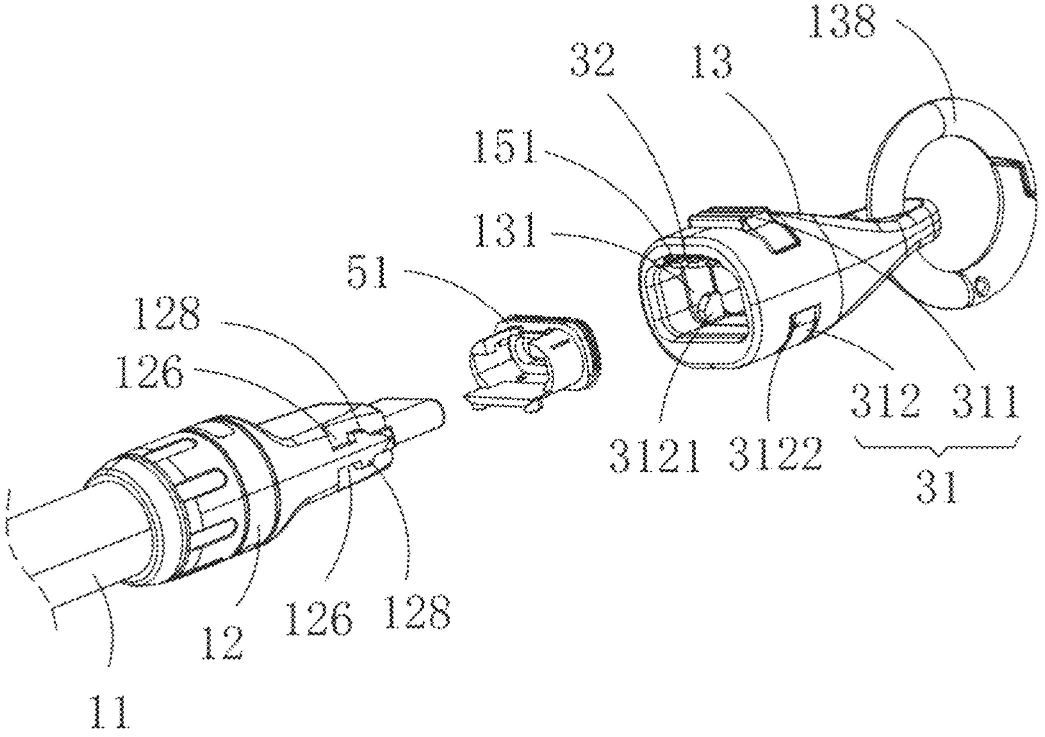
FIG. 11 is an exploded view of a partial structure of the data cable according to a third embodiment of the present disclosure.

Please refer to FIG. 11. Specifically, the first locking structure 20 includes a lock-cooperating structure 128, and the second locking structure 30 includes a second locking member 31. The second locking member 31 is inserted through the sleeve joint 13 and movably connected to the sleeve joint 13. A portion of the second locking member 31 extends into the accommodating groove 131 and engages with the lock-cooperating structure 128. The second locking member 31 moves in the direction perpendicular to the axis of the accommodating groove 131 to lock or unlock the lock-cooperating structure 128.

Understandably, the movement direction of the second locking member 31 on the sleeve joint 13 is specifically along the direction perpendicular to the axis of the accommodating groove 131 and along the directions indicated by two ends perpendicular to the axis of the accommodating groove 131, and the directions indicated by the two ends are oriented opposite. Consequently, the overall motion of the second locking member 31 allows the portion of the second locking member 31 that enters the accommodating groove 131 to move in a consistent manner and direction. Specifically, when the second locking member 31 is moved in the direction indicated by one end perpendicular to the axis of the accommodating groove 131, the portion of the second locking member 31 that enters the accommodating groove 131 can also be moved in the same direction, temporarily withdrawing from the accommodating groove 131, which facilitates the insertion of the plug 12 into the accommodating groove 131. After the completion of insertion, the second locking member 31 can then be moved along the direction of the other end perpendicular to the axis of the accommodating groove 131, such that the portion of the second locking member 31 that enters the accommodating groove 131 will move in the same direction, which is opposite to the previous movement direction, allowing the second locking member 31 temporarily away from the accommodating groove 131 to approach and re-enter the accommodating groove 131, so as to engage with the lock-cooperating structure 128 that enters the accommodating groove 131 on the plug 12 to lock the lock-cooperating structure 128, thereby securing the plug 12 inserted into the accommodating groove 131. This configuration enhances the stability and connection strength of the plug 12, which is configured to form a lanyard shape through the sleeve joint 13, and effectively mitigates issues related to insufficient connection strength and poor stability, which could lead to the plug 12 and the sleeve joint 13 detaching after the data cable 1 assumes a lanyard configuration. Furthermore, when the lanyard shape is no longer required, the portion of the second locking member 31 that enters the accommodating groove 131 can be moved in a direction perpendicularly to the axis of the accommodating groove 131 to unlock the lock-cooperating structure 128, thereby separating the plug 12 from the sleeve joint 13, which further enhances the flexibility of the connection between the sleeve joint 13 and the plug 12.

Figure 12:
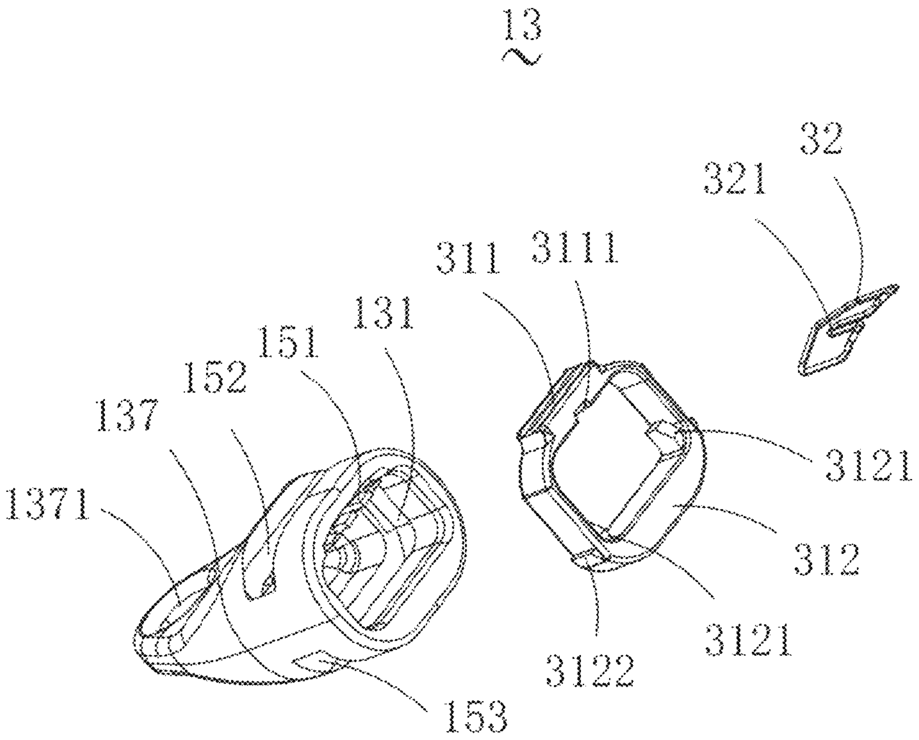
FIG. 12 is an exploded view of the sleeve joint of the data cable according to the third embodiment of the present disclosure.

Please refer to FIGS. 11 and 12. Further, the second locking member 31 includes a contact-pressing portion 311 and a snap portion 312 that are exposed from the sleeve joint 13. A portion of the snap portion 312 extends into the accommodating groove 131 and engages with the lock-cooperating structure 128. The contact-pressing portion 311 moves along the direction perpendicular to the axis of the accommodating groove 131 to drive the snap portion 312 to move along the direction perpendicular to the axis of the accommodating groove 131 to lock or unlock the lock-cooperating structure 128.

Specifically, the contact-pressing portion 311 and the snap portion 312 are uniformly integrated to constitute a complete second locking member 31, which enhances the stability of the connection between the contact-pressing portion 311 and the snap portion 312 and increases the overall structural integrity of the second locking member 31. A first window 152 and a second window 153 may be provided on the sleeve joint 13, corresponding to the contact-pressing portion 311 and the snap portion 312, respectively. Both the first window 152 and the second window 153 are through the accommodating groove 131 and are arranged in opposition to one another. Both are located on the sleeve joint 13 in the direction perpendicular to the axis of the accommodating groove 131, facilitating the movement of the contact-pressing portion 311 and the snap portion 312 along the direction perpendicular to the axis of the accommodating groove 131. In the absence of applied pressure, the contact-pressing portion 311 is exposed to the surface of the sleeve joint 13 through the first window 152. Additionally, a portion of the snap portion 312 is also exposed to the surface of the sleeve joint 13 through the second window 153, while another portion of the snap portion 312 is located directly within the accommodating groove 131. The portion of the snap portion 312 that is located within the accommodating groove 131 engages directly with the lock-cooperating structure 128 on the plug 12, thereby locking the lock-cooperating structure 128. Consequently, the user may press the contact-pressing portion 311, facilitating its movement from the first window 152 along the direction perpendicular to the axis of the accommodating groove 131, that is, the contact-pressing portion 311 moves towards the accommodating groove 131, allowing a portion of the contact-pressing portion 311 to enter the accommodating groove 131. This movement subsequently drives the snap portion 312 to move along the direction perpendicular to the axis of the accommodating groove 131, causing a portion of the snap portion 312 to move from the second window 153 in a direction away from the accommodating groove 131. As a result, the portion of the snap portion 312 that has entered the accommodating groove 131 exits the accommodating groove 131, such that the plug 12 can enter the accommodating groove 131 or the lock-cooperating structure 128 that has been engaged and locked can be unlocked, ultimately allowing for the separation of the plug 12 from the sleeve joint 13.

Understandably, by providing the contact-pressing portion 311 and the snap portion 312, the moving direction and distance of the snap portion 312 along the direction perpendicular to the axis of the accommodating groove 131 can be regulated through pressing, which facilitates a more user-friendly operation.

Please refer to FIG. 11 and FIG. 12. Further, a bracket 151 and a second elastic member 32 are provided in the accommodating groove 131. One end of the second elastic member 32 is sleeved on the bracket 151, and the other end of the second elastic member 32 is connected to the contact-pressing portion 311.

Understandably, a bracket 151 and a second elastic member 32 may be disposed in the accommodating groove 131. The second elastic member 32 is wound around or sleeved on the bracket 151, such that the second elastic member 32 is supported by the bracket 151 to prevent the second elastic member 32 from being separated from the accommodating groove 131. Specifically, the portion of the second elastic member 32 that is not connected to the bracket 151 may be directly connected to the contact-pressing portion 311, specifically connected to the side of the contact-pressing portion 311 close to the accommodating groove 131. Consequently, when the user applies pressure to the contact-pressing portion 311, the second elastic member 32 located on a side of the contact-pressing portion 311 close to the accommodating groove 131 will also experience a force, resulting in the generation of elastic force. This elastic force will be transmitted directly to the contact-pressing portion 311, facilitating a more rapid reset of the contact-pressing portion 311, which in turn ensures the timely resetting of the snap portion 312. Furthermore, the second elastic member 32 serves to inhibit inadvertent contact with the contact-pressing portion 311 by the user. It is necessary for the user to apply an adequate amount of force to enable the contact-pressing portion 311. In this embodiment, the second elastic member 32 may be configured as a torsion spring or any other type of elastic member capable of producing elastic force, as long as the reset function of the contact-pressing portion 311 can be achieved.

Please refer to FIG. 12. Further, a positioning groove 3111 is disposed on a side of the contact-pressing portion 311 close to the accommodating groove 131. A portion of a bent section 321 of the second elastic member 32 is located in the positioning groove 3111.

Understandably, one end of the second elastic member 32 is sleeved onto the bracket 151, while the opposite end serves as both the starting and ending point of the second elastic member 32. The starting and ending points thereof are directly connected to the side of the contact-pressing portion 311 close to the accommodating groove 131. The portion of the second elastic member 32 sleeved onto the bracket 151 can be configured as an arched shape, thereby maximizing the sleeve area and enhancing the stability of the sleeve and optimizing the support provided by the bracket 151 to the second elastic member 32. Additionally, a bent section is formed in the central area of the arched second elastic member 32. The contact-pressing portion 311 is provided with a positioning groove 3111 corresponding to the bent section 321, which is also located in the central area of the side of the contact-pressing portion 311 close to the accommodating groove 131. By positioning the apex of the bent section 321 within the positioning groove 3111, the force exerted by the user on the contact-pressing portion 311 can be effectively transmitted through the starting point, the ending point, and the bent section 321 of the second elastic member 32, which ensures a more uniform distribution of force across the second elastic member 32. Furthermore, the contact area between the second elastic member 32 and the contact-pressing portion 311 is increased, thereby enhancing the support provided by the second elastic member 32 to the contact-pressing portion 311 and improving the resetting capability of the second elastic member 32 with respect to the contact-pressing portion 311.

It should be noted that the lock-cooperating structure 128 may take the form of either the third clamping protrusion 1281 or the clamping groove 1282. The third embodiment illustrates a scenario in which the lock-cooperating structure 128 is specifically identified as the third clamping protrusion 1281. For further details, please refer to FIGS. 13 and 14, which depict the lock-cooperating structure 128 as the third clamping protrusion 1281.

Figure 13:
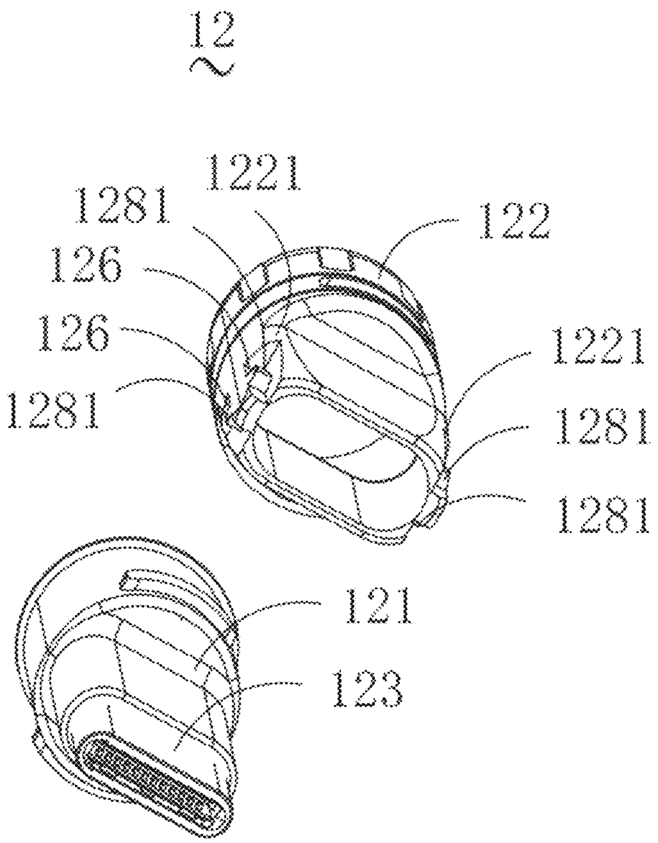
FIG. 13 is a schematic diagram of the exploded structure of the plug of the data cable according to the third embodiment of the present disclosure.
Figure 14:
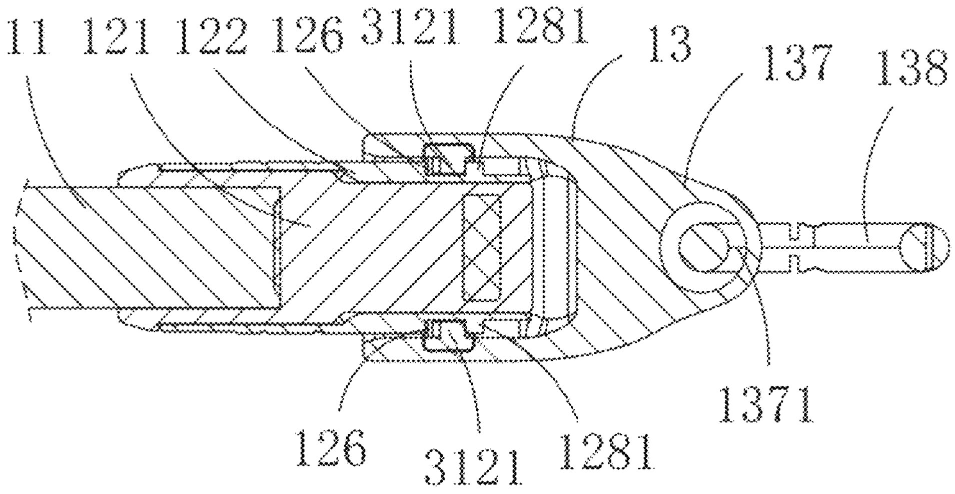
FIG. 14 is a cross-section view of the data cable in a lanyard state according to the third embodiment of the present disclosure.

Please refer to FIGS. 13 and 14. Further, a first limiting block 3121 is provided on one side of the snap portion 312 close to the accommodating groove 131, and a limiting region 126 is formed between the lock-cooperating structure 128 and the area of the housing 122 where the lock-cooperating structure 128 is disposed. The first limiting block 3121 moves along the direction perpendicular to the axis of the accommodating groove 131 to enter or leave the limiting region 126 to correspondingly lock or unlock the lock-cooperating structure 128.

Understandably, when the lock-cooperating structure 128 is identified as the third clamping protrusion 1281, the limiting region 126 is formed by the area on the housing 122 where the lock-cooperating structure 128 is disposed and the lock-cooperating structure 128, that is, the limiting region 126 is formed by the area on the housing 122 where the third clamping protrusion 1281 is disposed and the third clamping protrusion 1281. The number and position of the limiting regions 126 corresponds directly to the number and position of the third clamping protrusions 1281. The portion of the snap portion 312 that enters into the accommodating groove 131 is referred to as the first limiting block 3121, which directly located within the accommodating groove 131 when not subjected to pressure. In instances where the sleeve joint 13 requires insertion, the contact-pressing portion 311 can be activated to exert pressure, causing the first limiting block 3121 to move along with the snap portion 312, along the direction perpendicular to the axis of the accommodating groove 131, thereby vacating its initial position within the accommodating groove 131 and allowing the plug 12 to enter the accommodating groove 131, with the limiting region 126 located at the position corresponding to the first limiting block 3121. At this time, the application of pressure can cease, and the contact-pressing portion 311 drives the movement of the snap portion 312 in the direction perpendicular to the axis of the accommodating groove 131 but opposite to the previous pressure application direction, effectively resetting the contact-pressing portion 311 and the snap portion 312 to drive the first limiting block 3121 to reset. Consequently, the first limiting block 3121 can enter the limiting region 126 and abut against the third clamping protrusion 1281. Specifically, the side of the first limiting block 3121 away from the groove notch of the accommodating groove 131 will abut against the side of the third clamping protrusion 1281 close to the cable body 11. At this point, both the first limiting block 3121 and the third clamping protrusion 1281 will be immobilized with respect to the insertion or removal direction of the plug 12 into the accommodating groove 131, thereby securing the third clamping protrusion 1281 in place through the first limiting block 3121. This configuration effectively restricts the first limiting block 3121 and the third clamping protrusion 1281 to their current positions via the limiting region 126, preventing the third clamping protrusion 1281 from further entering into the accommodating groove 131. Simultaneously, this configuration limits the insertion depth of the plug 12 into the accommodating groove 131, thereby mitigating the risk of misalignment with the first limiting block 3121 caused by the plug 12 inserting into the accommodating groove 131 too deeply.

When the sleeve joint 13 is no longer required, the contact-pressing portion 311 can be pressed in a same manner, causing it to drive the first limiting block 3121 located on the snap portion 312 to move along the direction perpendicular to the axis of the accommodating groove 131, specifically in the direction away from the accommodating groove 131. Consequently, the first limiting block 3121 vacates its current position and disengages from the limiting region 126, thereby unlocking the third clamping protrusion 1281.

Please refer to FIG. 11 and FIG. 12. Further, a limiting protrusion 3122 is provided on a side of the snap portion 312 facing away from the accommodating groove 131. The limiting protrusion 3122 abuts against the side wall of the sleeve joint 13.

Understandably, a limiting protrusion 3122 may be provided on the surface of the snap portion 312, specifically on the side of the snap portion 312 away from the accommodating groove 131. The limiting protrusion 3122 is configured to abut against the side wall of the sleeve joint 13, namely the window wall of the second window 153. This configuration serves to restrict the position of the snap portion 312 when it is not pressed, thereby maintaining the snap portion 312 in its current position. Furthermore, the movement of the snap portion 312 towards one end of the contact-pressing portion 311 along the direction perpendicular to the axis of the accommodating groove 131 is also constrained. That is, the distance that the snap portion 312 moves into the accommodating groove 131 along the direction perpendicular to the axis of the accommodating groove 131 is limited. This limitation ensures that the snap portion 312 does not extend excessively into the accommodating groove 131, thereby preserving the stability of the connection between the second locking member 31 and the sleeve joint 13.

In this embodiment, there is no restriction on the quantity of the third clamping protrusions 1281. For example, at least one third clamping protrusion 1281 may be provided on one side of the housing 122, or alternatively, two third clamping protrusions 1281 may be symmetrically arranged on one same side of the plug 12. The quantity of the first limiting blocks 3121 may correspond with that of the third clamping protrusions 1281.

Please refer to FIG. 13, preferably, the third clamping protrusions 1281 are arranged on the two sides of the housing 122. Specifically, each of the two opposing sides of the housing 122 is provided with two third clamping protrusions 1281, arranged symmetrically. The quantity and placement of the first limiting blocks 3121 on the snap portion 312 must correspond to the areas of the housing 122 where the third clamping protrusions 1281 are located. That is, the snap portion 312 is provided with two first limiting blocks 3121, which are positioned opposite each other to align with the areas of the third clamping protrusions 1281 on the housing 122, thereby achieving a one-to-one locking effect between the third clamping protrusions 1281 and the first limiting blocks 3121. Additionally, the two sides of the housing 122 where the third clamping protrusions 1281 are disposed face opposite to each other and face away from each other, and the two third clamping protrusions 1281 on one side that are symmetrical are also symmetrical to the two third clamping protrusions 1281 on the other opposite side that are symmetrical, thus ensuring overall symmetry of the plug 12. As a result, whether the plug 12 is inserted in the forward direction or rotated 180 degrees for reverse insertion, the two third clamping protrusions 1281 on the opposing sides will engage and lock with the corresponding first limiting blocks 3121, enhancing user convenience. Furthermore, two third clamping protrusions 1281 are respectively positioned on two opposing sides of the housing 122, which allows for a symmetrical distribution of the third clamping protrusions 1281 with respect to the entire plug 12. Consequently, when locked with the first limiting block 3121, the locking force is distributed more evenly, enhancing the locking effect once the plug 12 and the sleeve joint 13 are interconnected. This configuration significantly improves the stability of the connection between the plug 12 and the sleeve joint 13, mitigates the risk of unilateral locking and ensuring a more stable clamping effect, and further enhances the locking effectiveness following the connection and securing of the sleeve joint 13 and the plug 12.

Figure 15:
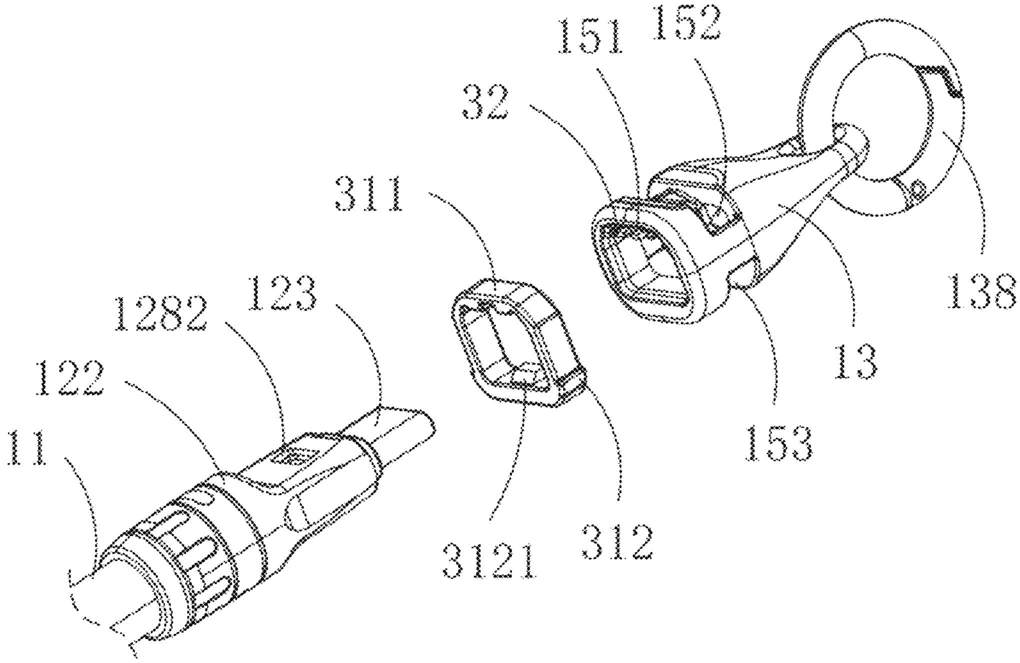
FIG. 15 is an exploded view of a partial structure of the data cable according to a fourth embodiment of the present disclosure.

Please refer to FIG. 15. A fourth embodiment of the present disclosure is provided, which differs from the third embodiment in that the lock-cooperating structure 128 in the fourth embodiment is configured as the clamping groove 1282, whereas the lock-cooperating structure 128 in the third embodiment is configured as the third clamping protrusion 1281.

In instances where the lock-cooperating structure 128 utilizes the clamping groove 1282, the designated position of the first limiting block 3121 on the sleeve joint 13 is located on the snap portion 312. Specifically the first limiting block 3121 is located on the side of the snap portion 312 that directly faces the second elastic member 32. Concurrently, the position of the clamping groove 1282 on the housing 122 must align with the position of the first limiting block 3121. Consequently, as the plug 12 is inserted into the accommodating groove, the first limiting block 3121 can enter into the clamping groove 1282 and abuts against the groove wall of the clamping groove 1282, thereby locking the plug 12 in place.

Specifically, the clamping groove 1282 may be disposed on one side of the housing 122 corresponding to the first limiting block 3121. Alternatively, the clamping groove 1282 may be respectively positioned on two opposing sides of the housing 122, such that a single first limiting block 3121 corresponds to two symmetrically arranged clamping grooves 1282. This configuration facilitates the engagement and locking between the clamping groove 1282 and the first limiting block 3121, regardless of whether the plug 12 is inserted in the forward orientation or rotated 180 degrees for reverse insertion.

A fifth embodiment of the present disclosure is provided, distinguished from the other embodiments by the variation in the configurations of the first locking structure 20 and the second locking structure 30, while the other structural components may remain unchanged.

Figure 16:
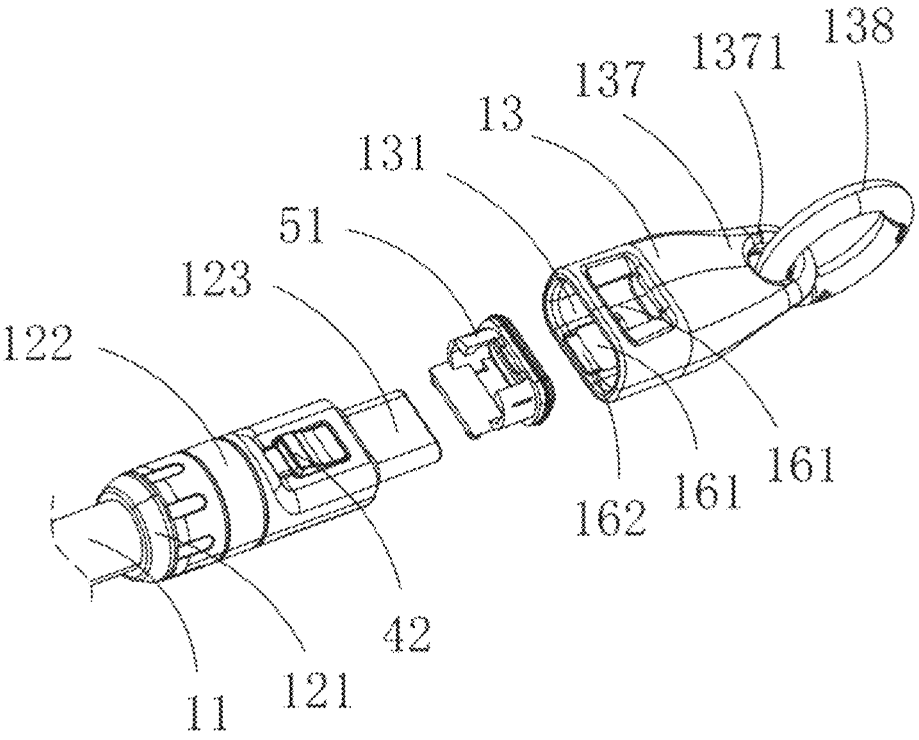
FIG. 16 is an exploded view of a partial structure of the data cable according to a fifth embodiment of the present disclosure.
Figure 17:
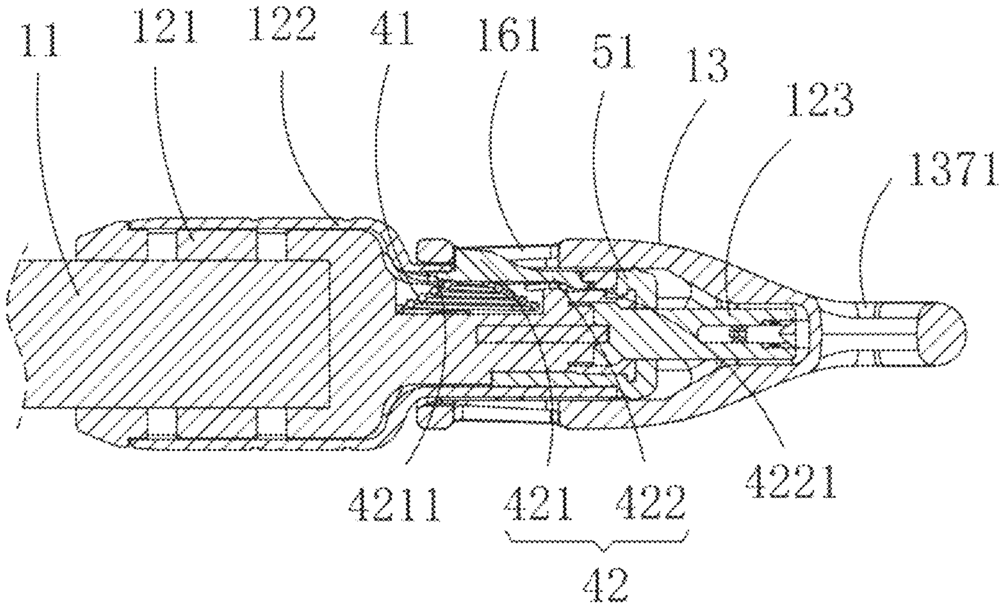
FIG. 17 is a cross-section view of the data cable according to the fifth embodiment of the present disclosure.

Please refer to FIGS. 16 and 17. Specifically, the first locking structure 20 includes a floating plate 42 and a third elastic member 41. A first accommodating groove 1214 is provided on at least one side of the connecting member 121. The third elastic member 41 is arranged in the first accommodating groove 1214. One end of the third elastic member 41 away from the first accommodating groove 1214 is connected to the floating plate 42. The second locking structure 30 includes a clamping hole 161. An inserting hole 1223 is provided on the housing 122. A portion of the floating plate 42 passes through the inserting hole 1223 and the clamping hole 161 in sequence to be exposed on the surface of the sleeve joint 13 and clamped with the clamping hole 161.

Specifically, the first accommodating groove 1214 that accommodates the third elastic member 41, may be disposed at the connecting member 121, which allows the floating plate 42 to be positioned between the connecting member 121 and the housing 122 via the housing 122, thereby ensuring that the floating plate 42 is securely held in place through the clamping action between the connecting member 121 and the housing 122. To facilitate the exposure of a portion of the floating plate 42 from the housing 122, an inserting hole 1223 may be provided on the housing 122, such that a portion of the floating plate 42 can extend beyond the housing 122, making it visible on the surface of the housing 122. The shape of the inserting hole 1223 is tailored to match the contour of the exposed portion of the floating plate 42, ensuring that the boundary of the exposed portion thereof aligns seamlessly with the wall of the inserting hole 1223, so as to prevent the ingress of fine particles, such as dust, through any gaps between the inserting hole 1223 and the floating plate 42.

Understandably, the floating plate 42 is located between the connecting member 121 and the housing 122, that is, the portion of the floating plate that is not exposed from the housing 122 is clamped between the connecting member 121 and the housing 122. This configuration indicates that the floating plate 42 functions as an independent structure with respect to the housing 122, rather than being an integral structure formed integrally with the housing 122. Consequently, the combined effects of the connection provided by the third elastic member 41 and the clamping effect between the housing 122 and the connecting member 121 ensure that the floating plate 42 is firmly connected to the plug 12, which enhances the stability of the connection between the floating plate 42 and the plug 12, thereby mitigating the issues associated with existing data cables that utilize a lanyard design featuring a partially connected clamping block that is integrally formed with the outer housing. Such designs often suffer from inadequate local connection strength, leading to a loss of elasticity or even breakage after repeated plugging and unplugging, which adversely impacts the user experience.

Understandably, when the plug 12 is inserted into the accommodating groove 131 for connection, the floating plate 42 is able to move towards the plug 12 due to the groove wall of the accommodating groove 131 abutting against the floating plate 42, which causes the third elastic member 41 to contract. When the floating plate 42 aligns with the clamping hole 161 on the sleeve joint 13, the third elastic member 41 expands, allowing the floating plate 42 to move away from the plug 12 under the elastic force exerted by the third elastic member 41. Consequently, the floating plate 42 is exposed to the surface of the housing 122 and the clamping hole 161 in sequence, ultimately clamping with the clamping hole 161 and locking the plug 12 inserted into the accommodating groove 131.

It should be noted that the length of the clamping hole 161 is shorter than the length of the entire floating plate 42. After the insertion of the plug 12 into the accommodating groove 131, since the length of the clamping hole 161 is less than the length of the entire floating plate 42, the clamping hole 161 cannot allow the floating plate 42 exposed in the housing 122 to entirely pass through the clamping hole 161. Consequently, only the floating portion 421 of the floating plate 42 is able to pass through the clamping hole 161. As the floating portion 421 that exposes from the surface of the housing 122 clamps with the wall of the clamping hole 161, the inner wall of the accommodating groove 131 abuts against the fixing portion 422 of the floating plate 42 that inserts into the inserting hole 1223 and maintains a planar state with the inserting hole 1223. This configuration effectively secures the fixing portion 422 in its current position, preventing the floating plate 42 from dislodging and facilitating relative movement of the floating portion 421 with respect to the fixing portion 422 in the radial direction of the clamping hole 161. Simultaneously, the inner wall of the accommodating groove 131 abuts against the fixing portion 422 of the floating plate 42, which provides a stable platform for the entire floating plate 42 and ensures balance and stability of the floating plate 42 during movement.

Figure 18:
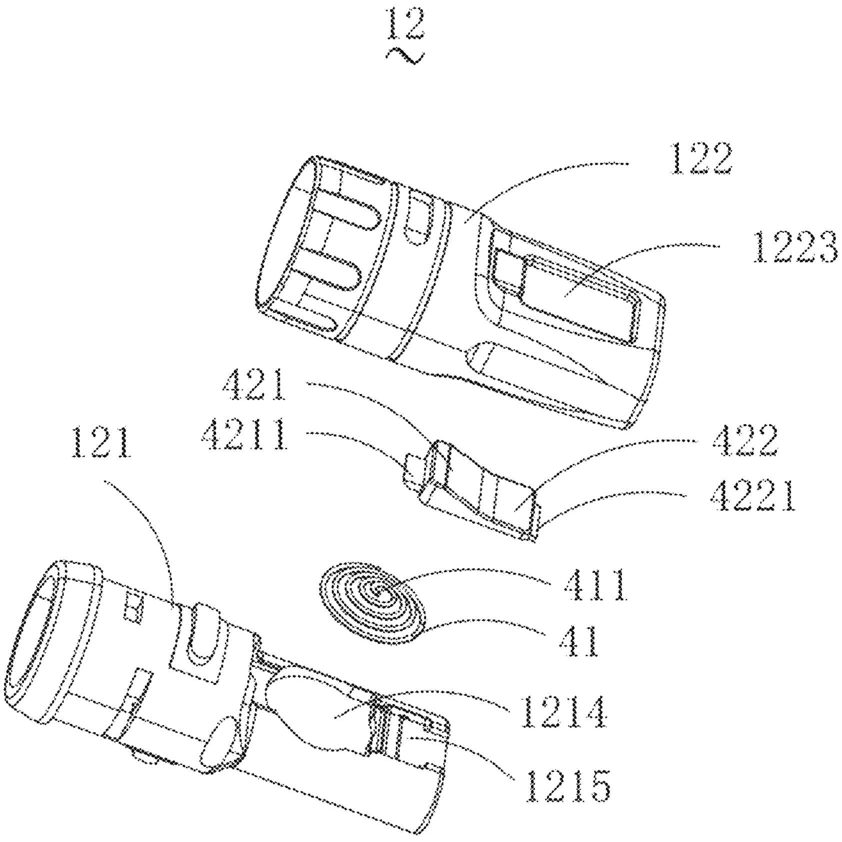
FIG. 18 is an exploded view of the plug of the data cable according to the fifth embodiment of the present disclosure.

Please refer to FIG. 18. Specifically, the third elastic member 41 is arranged in a spiral configuration within the first accommodating groove 1214. The side of the floating portion 421 close to the first accommodating groove 1214 is connected to the spiral center 411 of the third elastic member 41. The third elastic member 41 occupies the entirety of the first accommodating groove 1214 in its spiral form. The connection between the side of the floating portion 421 near the first accommodating groove 1214 and the third elastic member 41 extends from the spiral center 411 to the outer edge of the third elastic member 41. The convergence of the third elastic member 41 at the spiral center 411 makes the elasticity at this location maximum, thereby enabling the floating plate 42 to return to its original position more efficiently under the influence of the third elastic member 41 when it is not subjected to pressure.

Optionally, in this embodiment, there are no restrictions on the quantity of the floating plates 42 and the third elastic members 41. A floating plate 42, along with its corresponding third elastic member 41, may be positioned on one same side of the housing 122. Alternatively, two floating plates 42 and their respective third elastic members 41 may be symmetrically arranged on either side of the housing 122, or a floating plate 42 and a corresponding third elastic member 41 may be arranged on every side of the housing 122. The number of the clamping holes 161 on the sleeve joint 13 may be aligned with the number of the floating plates 42, as long as there is a correspondence between the position and quantity of the floating plates 42, the third elastic members 41, and the clamping holes 161. In this embodiment, preferably a floating plate 42 and its corresponding third elastic member 41 are arranged on one side of the housing 122, while omitting the floating plate 42 and the third elastic member 41 on the other sides, thereby simplifying the structure and enhancing operational ease. The clamping holes 161 symmetrically arranged are provided on two opposing sides of the sleeve joint 13. In instances where only one floating plate 42 is utilized, the plug 12 can still be inserted in the forward direction and can also be inserted in the reverse direction after being rotated 180 degrees, thus facilitating a more user-friendly plugging experience.

Please refer to FIGS. 17 and 18. Further, the floating plate 42 includes a floating portion 421 and a fixing portion 422. The end of the floating portion 421 away from the first accommodating groove 1214 passes through the inserting hole 1223 and is exposed on the surface of the housing 122. The end of the floating portion 421 close to the first accommodating groove 1214 is connected to the third elastic member 41, and the fixing portion 422 is clamped between the housing 122 and the connecting member 121.

Specifically, the end of the floating portion 421 away from the first accommodating groove 1214 is inclined towards the fixing portion 422. That is, the thickness of the floating portion 421 gradually decreases toward the fixing portion 422, creating an inclined shape of the floating portion 421, such that when the plug 12 is inserted into the accommodating groove 131, it facilitates a smoother entry into the groove. Additionally, this configuration prevents the floating portion 421 from abutting against the groove notch of the accommodating groove 131.

Understandably, the floating portion 421 and the fixing portion 422 are integrally constructed, which enhances the overall structural integrity of the floating plate 42. The thickness of the floating portion 421 exceeds that of the fixing portion 422, allowing the end of the floating portion 421 away from the first accommodating groove 1214 to pass through the inserting hole 1223 and be visible on the surface of the housing 122. That is, the floating portion 421 exhibits a convex shape with respect to the housing 122. Similarly, the end of the fixing portion 422 away from the connecting member 121 can also pass through the inserting hole 1223, aligning itself in a planar configuration with the surface of the housing 122. The boundary of the fixing portion 422 is clamped between the housing 122 and the connecting member 121, thereby ensuring that the fixing portion 422 is firmly held in its current position, which allows the fixing portion 422 to serve as a stabilizing element for the floating plate 42, thereby restricting the movement direction of the floating portion 421. That is, the floating portion 421 can move, with respect to the fixing portion 422, in a direction either towards or away from the first accommodating groove 1214.

Please refer to FIGS. 17 and 18. Further, a second limiting block 4211 is provided on the floating portion 421, and the second limiting block 4211 abuts against the inner wall of the housing 122. A fixing block 4221 is provided on the fixing portion 422, and a second accommodating groove 1215 is provided on the connecting member 121, and the fixing block 4221 is located in the second accommodating groove 1215 and abuts against the inner wall of the housing 122.

Understandably, a second limiting block 4211 may be disposed at the boundary of the floating portion 421, while a fixing block 4221 may be disposed at the boundary of the fixing portion 422, which ensures that both the second limiting block 4211 and the fixing block 4221 are securely clamped between the housing 122 and the connecting member 121 and abut against the wall of the housing 122. Consequently, the floating plate 42 is effectively secured between the housing 122 and the connecting member 121, thereby preventing any disconnection from the plug 12. In this embodiment, preferably, the second limiting block 4211 is disposed on a boundary of one end of the floating portion 421 away from the fixing portion 422, and the fixing block 4221 is disposed on a boundary of one end of the fixing portion 422 away from the floating portion 421. This configuration allows the second limiting block 4211 and the fixing block 4221 to be oriented opposite each other, ensuring that both the second limiting block 4211 and the fixing block 4221 abut against the housing 122 and the connecting member 121, which further stabilizes and secures the entire floating portion 421, thereby enhancing the stability of the connection between the housing 122, the floating portion 421 and the connecting member 121. Additionally, a second accommodating groove 1215 may be provided to accommodate the fixing portion 422, effectively isolating the third elastic member 41 from the fixing portion 422, which ensures that the third elastic member 41 does not establish a connection with the fixing portion 422, thereby preserving the mobility of the floating portion 421.

Understandably, the region from the groove notch of the accommodating groove 131 to the clamping hole 161 forms a sliding region 162, and the thickness of the sliding region 162 is lower than the thickness of the groove notch of the accommodating groove 131 except the sliding region 162. Therefore, the distance between the groove walls of the groove notch of the accommodating groove 131 can be greater than the distance between the other areas of the accommodating groove 131, such that the floating plate 42 can be more easily entering into the clamping hole 161 from the sliding region 162 for clamping.

Compared with the prior art, the data cable of the present disclosure has the following advantages.

In the present disclosure, the data cable 1 includes a cable body 11 and two plugs 12 respectively connected to two ends of the cable body 11. Each plug 12 is detachably connected to a sleeve joint 13 having an accommodating groove 131. A first locking structure 20 is provided on the plug 12, and a second locking structure 30 is provided on the sleeve joint 13 corresponding to the first locking structure 20. The second locking structure 30 is movably connected or fixedly connected to the sleeve joint 13. When the plug 12 enters the accommodating groove 131, the first locking structure 20 is locked with the second locking structure 30. By arranging the first locking structure and the second locking structure on the plug and the sleeve joint respectively, locking is achieved through the mutual cooperation between the first locking structure and the second locking structure, thereby achieving a firm connection between the plug and the sleeve joint. Additionally, the connection strength and stability between the plug 12 and the sleeve joint 13 is enhanced, thereby addressing the issues commonly associated with existing data cables that serve as lanyards, which often exhibit inadequate connection strength, poor stability, and a tendency to detach, thus failing to maintain a lanyard configuration.

In the present disclosure, the first locking structure 20 includes a first clamping protrusion 125 and a first magnetic member 124. The second locking structure 30 includes a locking tongue 132 and a second magnetic member 134. When the second magnetic member is aligned with the first magnetic member and a magnetic connection is established, the first clamping protrusion inserts into the through hole, allowing the locking tongue to enter into the locking groove for locking. Consequently, the first clamping protrusion 125 and the first magnetic member 124 on the plug are configured to respectively cooperate with the locking tongue 132 and the second magnetic member 134 on the sleeve joint, which facilitates both magnetic fixation and engagement locking, thereby improving the stability and firmness of the connection between the plug and the sleeve joint by the two methods of magnetic fixation and engagement locking, making a more robust and stable connection between the plug and the sleeve joint.

In the present disclosure, the clamping groove is formed between one side of the connecting member where the first groove is arranged and the housing, and a clamping block is arranged on the sleeve joint corresponding to the clamping groove. The clamping block can be inserted into the clamping groove, which improves the stability of the connection between the plug and the sleeve joint, resulting in a more secure and robust connection. Furthermore, the clamping block works in conjunction with the locking tongue to provide additional resistance against any relative movement of the sleeve joint with respect to the surface of the plug.

In the present disclosure, the first locking structure includes a second clamping protrusion, and the second clamping protrusion is arranged on at least one side of the housing. The second locking structure includes a first locking member, the first locking member is rotatably connected to the sleeve joint, and a portion of the first locking member extends into the accommodating groove and engages with the second clamping protrusion. The first locking member rotates in a direction close or away from the accommodating groove to lock or unlock the second clamping protrusion. A portion of the first locking member can be moved and enter into the accommodating groove of the sleeve joint to be engaged with the second clamping protrusion, thus the second clamping protrusion is effectively locked to ensure that the plug inserted into the accommodating groove is firmly locked, thereby enhancing the connection strength and stability of the plug through the sleeve joint, which takes on a lanyard configuration. This configuration mitigates the risk of inadequate connection strength between the plug and the sleeve joint, as well as the potential for instability that may lead to the plugs at both ends detaching when the data cable assumes a lanyard configuration. Furthermore, when the lanyard configuration is no longer required, the portion of the first locking member that extends into the accommodating groove can be moved in a direction away from the groove, thereby unlocking the second clamping protrusion. This action facilitates the separation of the plug from the sleeve joint, thereby further enhancing the flexibility of the connection between the plug and the sleeve joint.

In the present disclosure, the sleeve joint is provided with an elastic member, which is connected to the locking portion or the pressing portion. By providing the elastic member, the locking portion or the pressing portion can be reset more timely after the locking portion or the pressing portion rotates.

In the present disclosure, the first locking structure includes a lock-cooperating structure, and the second locking structure includes a second locking member. The second locking member is inserted through the sleeve joint and movably connected to the sleeve joint. A portion of the second locking member extends into the accommodating groove and engages with the lock-cooperating structure. The second locking member moves along the direction perpendicular to the axis of the accommodating groove 131 to lock or unlock the lock-cooperating structure. By providing the second locking member movably connected to the sleeve joint, the second locking member can be moved in a direction perpendicular to the axis of the accommodating groove, such that a portion of the second locking member can enter the accommodating groove and engage with the lock-cooperating structure on the plug entering the accommodating groove to lock the lock-cooperating structure, thereby locking the plug inserted into the accommodating groove, so as to improve the connection strength and stability of the plug in the configuration of a lanyard formed by the sleeve joint.

In the present disclosure, the first locking structure includes a floating plate and a third elastic member, and the second locking structure includes a clamping hole. An inserting hole is provided on the housing, and a portion of the floating plate passes through the inserting hole and the clamping hole in sequence to be exposed on the surface of the sleeve joint. The connection between the floating plate and the connecting member is established by positioning the third elastic member on the connecting member and linking the third elastic member to the floating plate. Additionally, a portion of the floating plate is securely clamped between the housing and the connecting member. This dual effect, involving both the connection of the third elastic member and the clamping action between the housing and the connecting member, ensures a robust attachment of the floating plate to the plug. Consequently, this configuration enhances the stability of the connection, thereby mitigating issues associated with a partially connected clamping block that is integrally formed on the outer housing. Such issues often lead to inadequate local connection strength, which can result in the loss of elasticity or even breakage after repeated plugging and unplugging, ultimately compromising the user experience.

In the present disclosure, the buckle portion is provided at one end of the sleeve joint away from the groove notch of the accommodating groove, and the buckle portion is separated from the accommodating groove. Therefore, after the sleeve joint is connected to the plug, the plug located in the accommodating groove is also separated from the buckle portion, thereby avoiding the influence of other structures on the plug when the buckle portion is connected to other structures.

The data cable disclosed in the embodiments of the present disclosure is introduced in detail above. Specific examples are used herein to illustrate the principle and implementation mode of the present disclosure. The description of the above embodiments is only used to help understand the method of the present disclosure and its core idea. For those skilled in the art, according to the idea of the present disclosure, there will be changes in the specific implementation mode and application scope. In summary, the content of this specification should not be understood as a limitation on the present disclosure. Any modifications, equivalent substitutions and improvements made within the principles of the present disclosure should be included in the protection scope of the present disclosure.

The invention claimed is:

1. A data cable, comprising a cable body and two plugs respectively connected to two ends of the cable body;

each plug being detachably connected to a sleeve joint having an accommodating groove;

a first locking structure being provided on the plug, and a second locking structure, corresponding to the first locking structure, being provided on the sleeve joint and being movably connected or fixedly connected to the sleeve joint; when the plug enters the accommodating groove, the first locking structure being locked with the second locking structure;

wherein the plug comprises a connecting member connected to the cable body and a housing sleeved to the connecting member, and the first locking structure is disposed at the connecting member and/or the housing;

wherein the first locking structure comprises a first clamping protrusion and a first magnetic member; a first groove being provided on the connecting member, and the housing being provided with a first opening corresponding to the first groove; the first magnetic member being disposed in the first groove and passing through the first opening to be exposed on a surface of the housing; the first clamping protrusion being disposed on a boundary of one side of the housing where the first opening is opened;

the second locking structure comprising a locking tongue and a second magnetic member; a second groove being provided on an inner wall of the accommodating groove corresponding to the first groove, and the second magnetic member being located in the second groove; a through hole that is through the accommodating groove being provided on the sleeve joint, and the locking tongue extending from the inner wall of the accommodating groove to one side of a hole wall of the through hole close to the plug;

a locking groove being provided on one side of the first clamping protrusion close to the first magnetic member; when the second magnetic member and the first magnetic member are aligned and magnetically attracted, the first clamping protrusion inserting into the through hole, and the locking tongue entering the locking groove for locking.

2. The data cable of claim 1, wherein a notch is provided on the sleeve joint at one side thereof opposite to one side of the sleeve joint where the locking tongue is disposed, the notch is through the accommodating groove, and the locking tongue and the second magnetic member are arranged on a same side of the sleeve joint.

3. The data cable of claim 1, wherein an inserting groove is formed between the housing and one side of the connecting member where the first groove is disposed, an inserting block is provided on the sleeve joint corresponding to the inserting groove, and the inserting block is inserted into the inserting groove.

4. A data cable, comprising a cable body and two plugs respectively connected to two ends of the cable body;

each plug being detachably connected to a sleeve joint having an accommodating groove;

a first locking structure being provided on the plug, and a second locking structure, corresponding to the first locking structure, being provided on the sleeve joint and being movably connected or fixedly connected to the sleeve joint; when the plug enters the accommodating groove, the first locking structure being locked with the second locking structure;

wherein the plug comprises a connecting member connected to the cable body and a housing sleeved to the connecting member, and the first locking structure is disposed at the connecting member and/or the housing;

wherein the first locking structure comprises a second clamping protrusion disposed on at least one side of the housing, and the second locking structure comprises a first locking member rotatably connected to the sleeve joint; a portion of the first locking member extending into the accommodating groove and engaging with the second clamping protrusion; the first locking member rotating in a direction close to or away from the accommodating groove to lock or unlock the second clamping protrusion.

5. The data cable of claim 4, wherein the first locking member comprises a locking portion, a pressing portion and a connecting portion disposed between the locking portion and the pressing portion, and the connecting portion is rotatably connected to the sleeve joint; a buckle groove being provided on one side of the locking portion close to the accommodating groove, and the second clamping protrusion entering the buckle groove and engaging with the buckle groove; the locking portion and the pressing portion rotating with respect to the connecting portion to drive the buckle groove to rotate with respect to the connecting portion to lock or unlock the second clamping protrusion.

6. The data cable of claim 5, wherein a first elastic member is provided on the sleeve joint, and the first elastic member is connected to the locking portion or the pressing portion.

7. The data cable of claim 5, wherein the sleeve joint is provided with a second opening, and the first locking member is engageably inserted into the second opening;

a shaft block being provided on an inner wall of the second opening, and a shaft groove matching the shaft block being provided on the connecting portion, and the connecting portion rotating on the shaft block via the shaft groove.

8. A data cable, comprising a cable body and two plugs respectively connected to two ends of the cable body;

each plug being detachably connected to a sleeve joint having an accommodating groove;

a first locking structure being provided on the plug, and a second locking structure, corresponding to the first locking structure, being provided on the sleeve joint and being movably connected or fixedly connected to the sleeve joint; when the plug enters the accommodating groove, the first locking structure being locked with the second locking structure;

wherein the plug comprises a connecting member connected to the cable body and a housing sleeved to the connecting member, and the first locking structure is disposed at the connecting member and/or the housing;

wherein the first locking structure comprises a lock-cooperating structure, and the second locking structure comprises a second locking member inserted through the sleeve joint and movably connected to the sleeve joint; a portion of the second locking member extending into the accommodating groove and engaging with the lock-cooperating structure; the second locking member moving along a direction perpendicular to an axis of the accommodating groove to lock or unlock the lock-cooperating structure.

9. The data cable of claim 8, wherein the second locking member comprises a contact-pressing portion and a snap portion that are exposed from the sleeve joint, and a portion of the snap portion extends into the accommodating groove and engages with the lock-cooperating structure; the contact-pressing portion moving along the direction perpendicular to the axis of the accommodating groove to drive the snap portion to move along the direction perpendicular to the axis of the accommodating groove to lock or unlock the lock-cooperating structure.

10. The data cable of claim 9, wherein a bracket and a second elastic member are provided in the accommodating groove, one end of the second elastic member is sleeved on the bracket, and another end of the second elastic member is connected to the contact-pressing portion.

11. The data cable of claim 10, wherein a positioning groove is disposed on a side of the contact-pressing portion close to the accommodating groove, and a portion of a bent section of the second elastic member is located in the positioning groove.

12. The data cable of claim 11, wherein a first limiting block is provided on one side of the snap portion close to the accommodating groove, and a limiting region is formed between the lock-cooperating structure and a region of the housing where the lock-cooperating structure is disposed, and the first limiting block moves along the direction perpendicular to the axis of the accommodating groove to enter or leave the limiting region to correspondingly lock or unlock the lock-cooperating structure.

13. The data cable of claim 12, wherein a limiting protrusion is provided on a side of the snap portion facing away from the accommodating groove, and the limiting protrusion abuts against a side wall of the sleeve joint.

14. A data cable, comprising a cable body and two plugs respectively connected to two ends of the cable body;

each plug being detachably connected to a sleeve joint having an accommodating groove;

a first locking structure being provided on the plug, and a second locking structure, corresponding to the first locking structure, being provided on the sleeve joint and being movably connected or fixedly connected to the sleeve joint; when the plug enters the accommodating groove, the first locking structure being locked with the second locking structure;

wherein the plug comprises a connecting member connected to the cable body and a housing sleeved to the connecting member, and the first locking structure is disposed at the connecting member and/or the housing;

wherein the first locking structure includes a floating plate and a third elastic member, the third elastic member is arranged in a first accommodating groove that is provided on at least one side of the connecting member, and one end of the third elastic member away from the first accommodating groove is connected to the floating plate;

the second locking structure comprising a clamping hole, an inserting hole being provided on the housing, and a portion of the floating plate passing through the inserting hole and the clamping hole in sequence to be exposed on a surface of the sleeve joint and clamped with the clamping hole.

15. The data cable of claim 14, wherein the floating plate comprises a floating portion and a fixing portion, one end of the floating portion away from the first accommodating groove passes through the inserting hole and is exposed on a surface of the housing, one end of the floating portion close to the first accommodating groove is connected to the third elastic member, and the fixing portion is clamped between the housing and the connecting member.

16. The data cable of claim 15, wherein a second limiting block that abuts against an inner wall of the housing is provided on the floating portion, a fixing block is provided on the fixing portion, a second accommodating groove is provided on the connecting member, and the fixing block is located in the second accommodating groove and abuts against the inner wall of the housing.

17. The data cable of claim 14, wherein the connecting member is connected with a data interface, with a waterproof member provided at a connection position where the connecting member is connected to the data interface, and the waterproof member covers a boundary of the housing corresponding to the connection position where the connecting member is connected to the data interface.

18. The data cable of claim 14, wherein a buckle portion is provided at one end of the sleeve joint away from a groove notch of the accommodating groove, and the buckle portion is separated from the accommodating groove.

* * * * *